(12) United States Patent
Ma

(10) Patent No.: US 10,211,891 B2
(45) Date of Patent: Feb. 19, 2019

(54) SYSTEM AND METHOD FOR MULTI-USER MULTIPLE INPUT MULTIPLE OUTPUT COMMUNICATIONS

(71) Applicant: Futurewei Technologies, Inc., Plano, TX (US)

(72) Inventor: Zhengxiang Ma, Summit, NJ (US)

(73) Assignee: Futurewei Technologies, Inc., Plano, TX (US)

(*) Notice: Subject to any disclaimer, the term of this patent is extended or adjusted under 35 U.S.C. 154(b) by 48 days.

(21) Appl. No.: 14/724,639

(22) Filed: May 28, 2015

(65) Prior Publication Data

US 2016/0149622 A1 May 26, 2016

Related U.S. Application Data

(60) Provisional application No. 62/082,647, filed on Nov. 21, 2014.

(51) Int. Cl.
  *H04B 7/04* (2017.01)
  *H04L 5/00* (2006.01)
  *H04B 7/0452* (2017.01)
  *H04B 7/0456* (2017.01)

(52) U.S. Cl.
  CPC ......... *H04B 7/0452* (2013.01); *H04B 7/0469* (2013.01); *H04B 7/0473* (2013.01); *H04L 5/0026* (2013.01); *H04L 5/0023* (2013.01)

(58) Field of Classification Search
  CPC .. H04B 7/0408; H04B 7/0413; H04B 7/0452; H04B 7/0469; H04B 7/0473; H04B 7/0495; H04B 7/10; H04L 5/0026; H04W 72/044; H04W 72/046; H04W 72/0466; H04W 72/121; H04W 72/1273
  See application file for complete search history.

(56) References Cited

U.S. PATENT DOCUMENTS

| | | | | |
|---|---|---|---|---|
| 7,826,471 | B2 * | 11/2010 | Wilson | H01Q 1/246 370/442 |
| 8,547,918 | B2 * | 10/2013 | Brueck | H04B 7/0417 370/329 |
| 8,565,193 | B2 * | 10/2013 | Ylitalo | H01Q 1/246 370/252 |
| 8,897,254 | B2 * | 11/2014 | Koivisto | H04B 7/0621 370/330 |
| 8,928,528 | B2 * | 1/2015 | Harel | H01Q 3/00 342/373 |
| 9,036,727 | B2 * | 5/2015 | Tesanovic | H04B 7/0639 375/259 |
| 9,219,583 | B2 * | 12/2015 | Xu | H04B 7/0413 |
| 9,343,808 | B2 * | 5/2016 | Harel | H01Q 3/00 |

(Continued)

FOREIGN PATENT DOCUMENTS

| | | |
|---|---|---|
| CN | 102237977 A | 11/2011 |
| CN | 104104417 A | 10/2014 |

*Primary Examiner* — Alpus Hsu
(74) *Attorney, Agent, or Firm* — Slater Matsil, LLP

(57) ABSTRACT

A method for operating a communications controller in a wireless communications system includes scheduling a pair of user equipments (UE) located in different ones of a plurality of split beams using an appropriate code pair that produces the plurality of split beams for multi-user multiple-input multiple output (MU-MIMO) mode transmission, and transmitting data packets to the pair of UEs in accordance with the appropriate code pair.

28 Claims, 21 Drawing Sheets

(56) References Cited

U.S. PATENT DOCUMENTS

| | | | |
|---|---|---|---|
| 9,431,702 B2* | 8/2016 | Hartenstein | H04B 7/0617 |
| 9,461,723 B2* | 10/2016 | Sajadieh | H04L 5/0085 |
| 9,553,642 B2* | 1/2017 | Ma | H04B 7/0456 |
| 9,698,889 B2* | 7/2017 | Xue | H04B 7/0452 |
| 9,791,552 B1* | 10/2017 | Schuman | G01S 7/4026 |
| 2008/0293451 A1* | 11/2008 | Haskell | H04W 16/24 |
| | | | 455/562.1 |
| 2009/0010356 A1* | 1/2009 | Engstrom | H04B 7/0617 |
| | | | 375/267 |
| 2011/0103504 A1 | 5/2011 | Ma | |
| 2011/0176519 A1 | 7/2011 | Vitthaladevuni et al. | |
| 2011/0280197 A1 | 11/2011 | Brueck et al. | |
| 2013/0112672 A1 | 5/2013 | Keremes et al. | |
| 2014/0146765 A1 | 5/2014 | Ji et al. | |
| 2014/0226517 A1* | 8/2014 | Wilson | H01Q 1/246 |
| | | | 370/252 |
| 2016/0080051 A1* | 3/2016 | Sajadieh | H04B 7/0456 |
| | | | 375/267 |
| 2016/0381569 A1* | 12/2016 | Wang | H04W 16/28 |
| | | | 370/338 |

\* cited by examiner

90° HYBRID COUPLER

SYSTEM AND METHOD FOR MULTI-USER MULTIPLE INPUT MULTIPLE OUTPUT COMMUNICATIONS

This application claims the benefit of U.S. Provisional Application No. 62/082,647, filed on Nov. 21, 2014, entitled "MU-MIMO Split-Beam Antenna System and Method," which application is hereby incorporated herein by reference.

TECHNICAL FIELD

The present disclosure relates generally to digital communications, and more particularly to a system and method for multi-user multiple input multiple output (MU-MIMO) communications.

BACKGROUND

In modern communications systems, such as The Third Generation Partnership Project (3GPP) Long Term Evolution (LTE) compliant communications systems, MU-MIMO with multiple antennas is a key component in improving overall communications system throughput. However, the performance improvement for communications systems with small numbers of antennas, such as 4 or 8 antennas, per evolved NodeB (eNB) may be disappointing in light of the increased complexity and cost of the communications system. This has limited the popularity of such communications systems for deployment.

SUMMARY OF THE DISCLOSURE

Example embodiments of the present disclosure provide a system and method for multi-user multiple input multiple output (MU-MIMO) communications.

In accordance with an example embodiment of the present disclosure, a method for operating a communications controller in a wireless communications system is provided. The method includes scheduling a pair of user equipments (UE) located in different ones of a plurality of split beams using an appropriate code pair that produces the plurality of split beams for multi-user multiple-input multiple output (MU-MIMO) mode transmission, and transmitting data packets to the pair of UEs in accordance with the appropriate code pair.

In accordance with another example embodiment of the present disclosure, a method for configuring a 3-sector wireless communications system by a designing device is provided. The method includes generating a plurality of split beams covering a first sector of the 3-sector communications system, mapping between the plurality of split beams and baseband antenna ports to equalize reference signal coverage between the baseband antenna ports, and prompting use of the plurality of split beams and the baseband antenna port mapping.

In accordance with another example embodiment of the present disclosure, a communications controller in a wireless communications system is provided. The communications controller includes a processor and a transmitter chain, and a computer readable storage medium storing programming for execution by the processor. The programming including instructions to schedule a pair of user equipments (UE) located in different ones of a plurality of split beams using an appropriate code pair that produces the plurality of split beams for multi-user multiple-input multiple output (MU-MIMO) mode transmission, and transmit data packets to the pair of UEs in accordance with the appropriate code pair. The communications controller includes a plurality of antennas coupled to the processor. The plurality of antennas transmits the plurality of split beams.

Practice of the foregoing example embodiments provide a split beam design along with novel mappings between baseband ports to antenna ports that improve MU-MIMO performance in communications systems with small number of antennas.

Moreover the example embodiments provide novel configurations for implementing power sharing between split beams while simplifying hardware design.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to MU-MIMO communications. For example, a communications controller schedules a pair of user equipments (UE) located in different ones of a plurality of split beams using an appropriate code pair that produces the plurality of split beams for multi-user multiple-input multiple output (MU-MIMO) mode transmission, and transmits data packets to the pair of UEs in accordance with the appropriate code pair.

The present disclosure will be described with respect to example embodiments in a specific context, namely communications systems that use split beams to implement MU-MIMO with small number of antennas. The disclosure may be applied to standards compliant communications systems, such as those that are compliant with Third Generation Partnership Project (3GPP), IEEE 802.11, and the like, technical standards, and non-standards compliant communications systems, that use split beams to implement MU-MIMO with small number of antennas.

Figure 1:
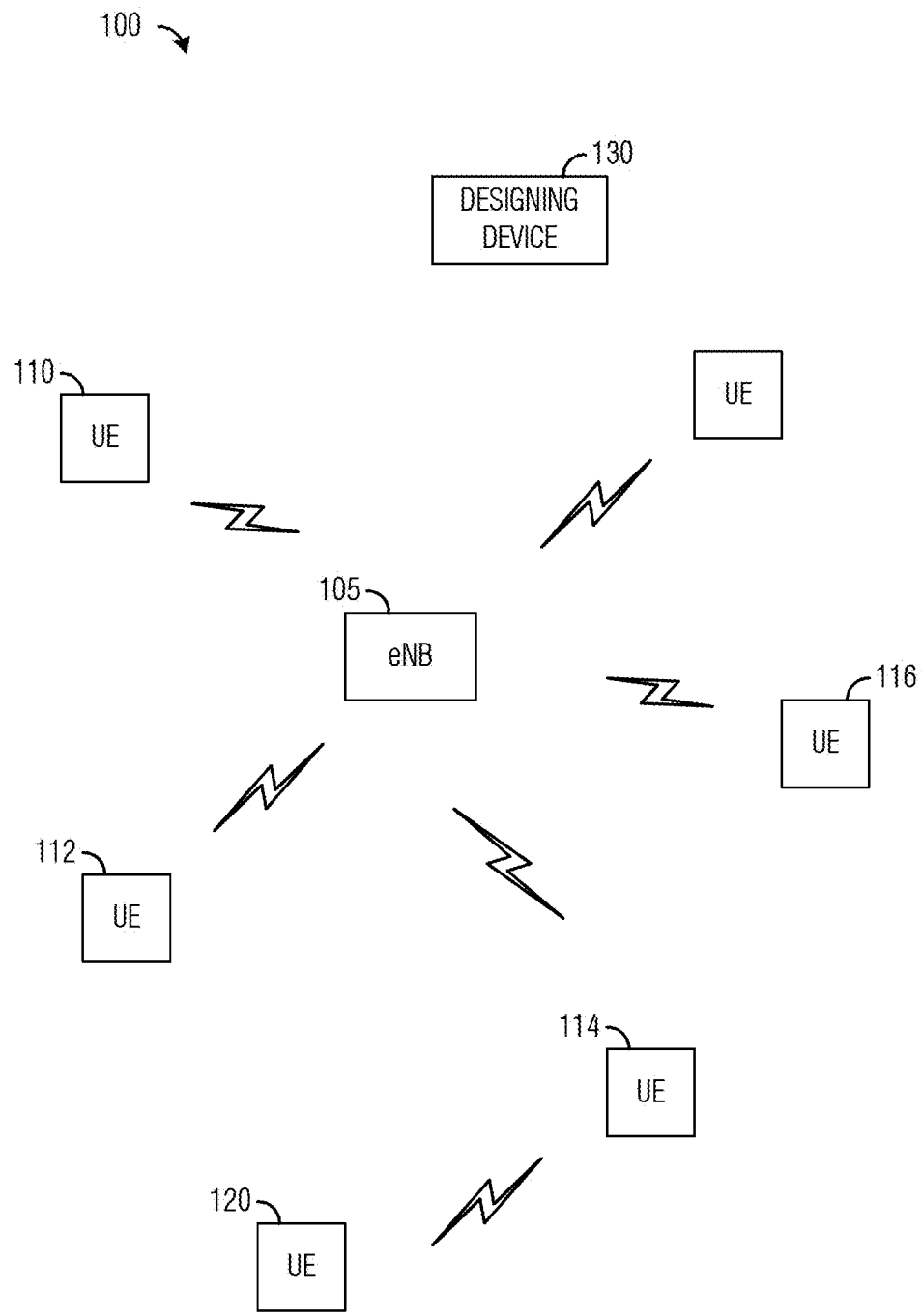
FIG. 1 illustrates an example communications system according to example embodiments described herein.

FIG. 1 illustrates an example communications system 100. Communications system 100 includes an evolved NodeB (eNB) 105 serving a plurality of user equipments (UEs) 110, 112, 114, 116. In a first operating mode, transmissions for UEs as well as transmissions by UEs pass through the eNB. The eNB allocates communications resources for the transmissions to or from the UEs. eNBs may also be commonly referred to as base stations, Node-Bs, transmission points, remote radio heads, or access points, and the like, while UEs may also be commonly referred to as mobiles, mobile stations, terminals, subscribers, users, wireless devices, and the like. Communications resources may be time resources, frequency resources, code resources, time-frequency resources, and the like. Communications system 100 can also include communication between UEs, such as UE 114 and UE 120. As an illustrative example, UE 114 and UE 120 are engaged in device to device communication and/or discovery, and UE 114 can relay messages between UE 120 and eNB 105.

Communications system 100 may include a designing device 130. Designing device 130 may be configured to design split beam antennas for communications system 100. Designing device 130 may also map split beams to baseband antenna ports to ensure coverage of reference signals. Designing device 130 may prompt the use of the split beam antennas, e.g., save the configuration of the split beam antennas to memory for subsequent use, provide the configuration of the split beam antennas to eNBs, and the like. Designing device 130 may be a stand-alone device as shown in FIG. 1. Alternatively, designing device 130 may be co-located with a network entity, such as an eNB.

While it is understood that communications systems may employ multiple eNBs capable of communicating with a number of UEs, only one eNB, and a number of UEs are illustrated for simplicity.

Generally, in MU-MIMO, an eNB (or multiple eNBs) simultaneously transmits to multiple independent UEs in order to achieve multi-user gain and increased overall communications system performance. In order to implement MU-MIMO, an eNB is required to have a plurality of transmit antennas. However, complexity and cost increase dramatically as the number of antennas increase. Hence, there is a tendency for communications system providers to limit the number of antennas per eNB.

Figure 2:
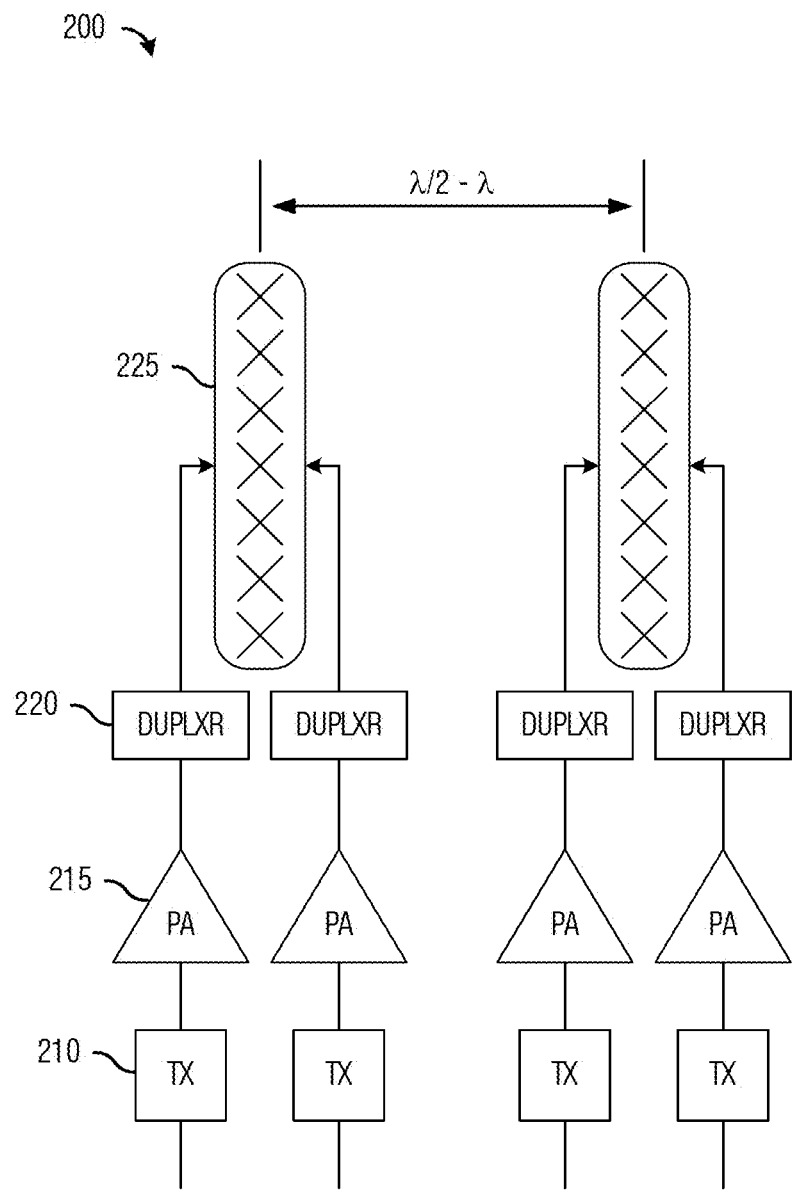
FIG. 2 illustrates an example four transmitter (4T) 3GPP LTE system employing a two-column ±45° cross-polarized antenna.

FIG. 2 illustrates an example four transmitter (4T) 3GPP LTE system 200 employing a two-column ±45° cross-polarized antenna. System 200 includes transmitters, such as transmitter 210, which are configured for filtering, equalizing, and the like, of signals being transmitted and/or received. System 200 also includes power amplifiers, such as power amplifier 215, duplexers, such as duplexer 220, and antennas, such as antenna 225. Each antenna usually has a beam width of 65°. The antenna spacing is typically between ½ and 1.5 times wavelength (λ). The downlink throughput gain of such a system over a traditional two transmitter (2T) system employing a single column antenna is typically about 20-30%. However, applying MU-MIMO techniques to a 4T LTE system may not significantly improve performance. Additionally, there is a significant cost increase over a traditional 2T LTE system. Therefore, 4T LTE systems are not very attractive to operators.

Figure 3:
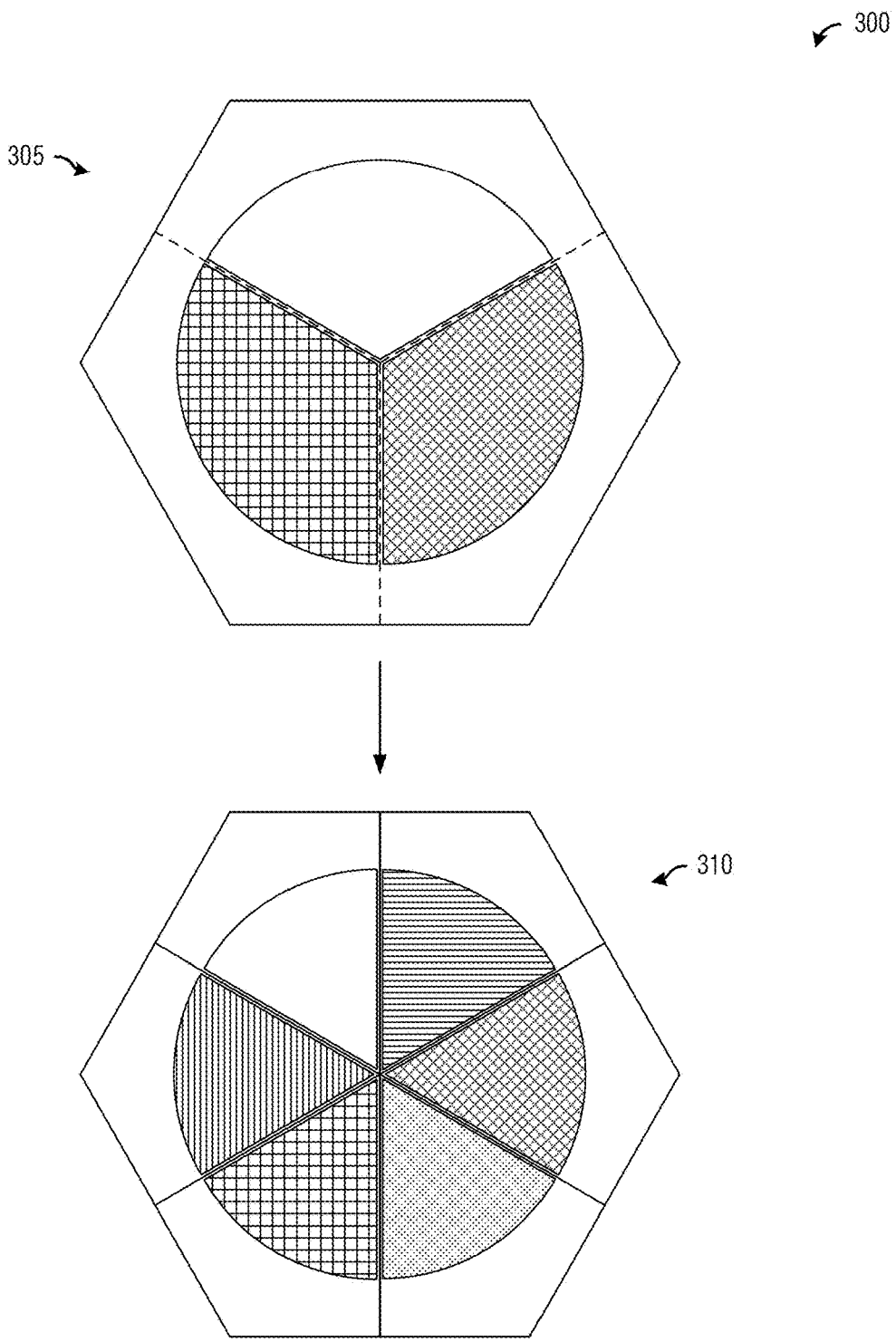
FIG. 3 illustrates an example sectorization change for an eNB site according to example embodiments described herein.

FIG. 3 illustrates an example sectorization change for an eNB site 300. Another way to increase system capacity is to increase sectorization. A first eNB site 305 has a typical three-sector sectorization with three 120-degree sectors. It may be straightforward to double the number of sectors to produce a second eNB site 310 that has six-sector sectorization with six 60-degree sectors. As an illustrative example, this approach has been employed in many code division multiple access (CDMA) communications systems and has yielded good results. If each sector retrains a 2T configuration, the total number of transmitters and receivers (TRX) is 12 (6 sectors*2 TRX per sector), which is the same as a three-sector site in a 4T configuration.

Figure 4A:
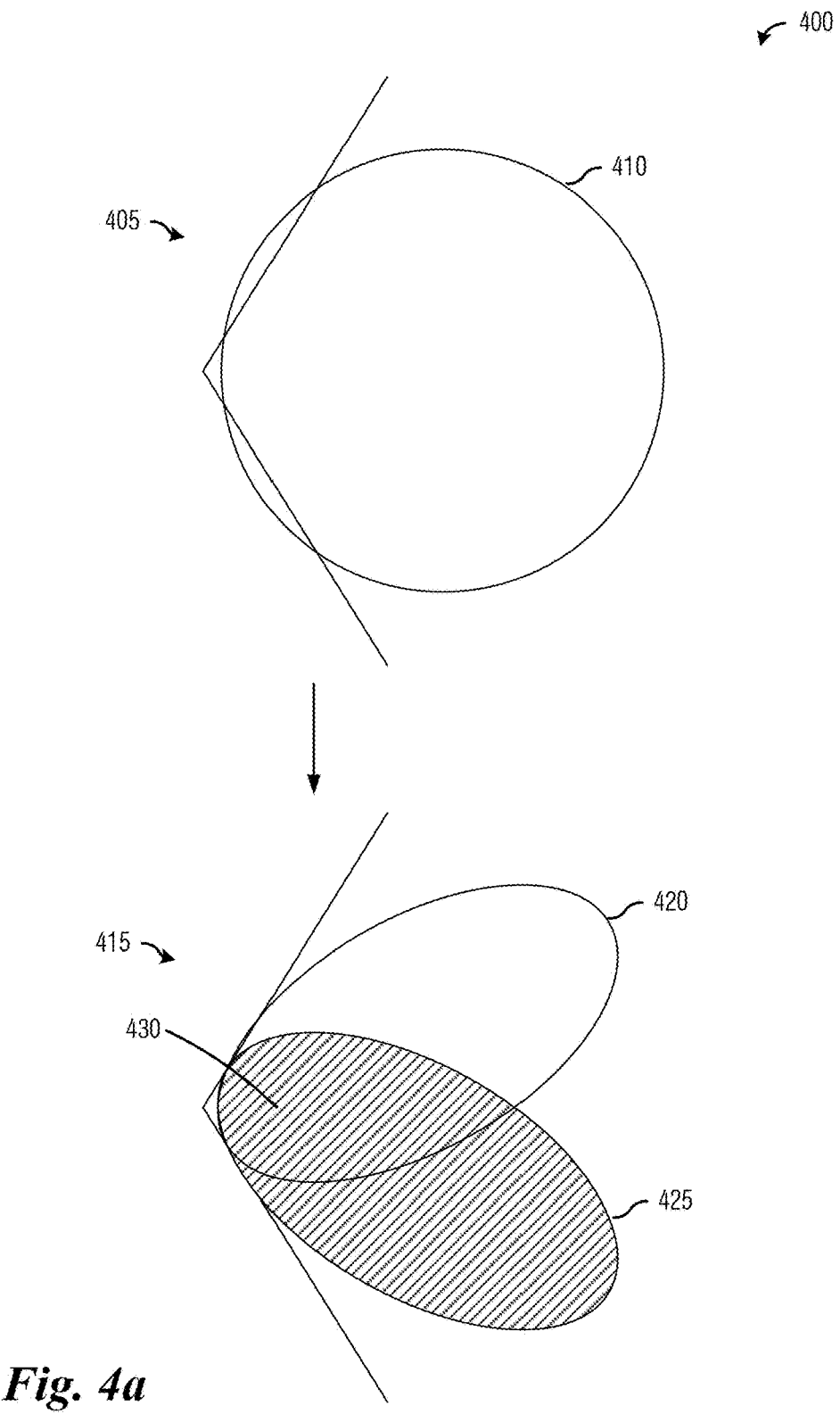
FIG. 4a illustrates an example antenna beam width configuration for an eNB site with different sectorization arrangements according to example embodiments described herein.

FIG. 4a illustrates an example antenna beam width configuration for an eNB site 400 with different sectorization arrangements. In a sector 405 of an eNB site with 120-degree sectors, an example antenna beam 410 may have a 65-degree antenna beam width antenna beam, while in a sector 415 of an eNB site with 60-degree sectors, example antenna beams 420 and 425 may each be 35-degree antenna beam width antenna beams. The doubling of the antenna beams effectively double the number of available communications resources. UEs that are under the coverage areas of the two beams (in the overlap area 430) may be scheduled to use the same frequency resource simultaneously.

When the two sectors operate completely independently in terms of their scheduling, however, they may interfere with each other due to the overlap in coverage. Therefore, the overall capacity gain is less than 100%, with normal simulation results for capacity gain being in the range of 60 to 80 percent for LTE communications systems, depending on the antenna beams being used and the angle spread in the channel. Furthermore, the use of eNB sites with six-sector sectorization requires network re-planning and re-optimization, which may increase deployment costs significantly. Additionally, the peak and cell-edge throughput is not improved dramatically.

According to an example embodiment, multi-column antennas are coupled to a radio frequency (RF) network that produces split beams in the horizontal dimension, and optionally vertical dimension, and which are then mapped to baseband ports.

According to an example embodiment, one or more of the following elements are included:
 a split beam antenna with patterns that are similar to that of a six-sector antenna is used in a three-sector 4T or 8T communications system supporting MU-MIMO;
 a mapping between the antenna beams and baseband antenna ports so that the coverage of reference signals is proper for standard MIMO processing is used;
 different down tilt angles for beams with different polarizations are used;
 a RF network is used after amplification to enable sharing of power amplifier (PA) resources among the beams; and
 a MU-MIMO pairing algorithm that allows for the pairing of UEs that can be simultaneously served with minimal mutual interference is used.

Figure 4B:
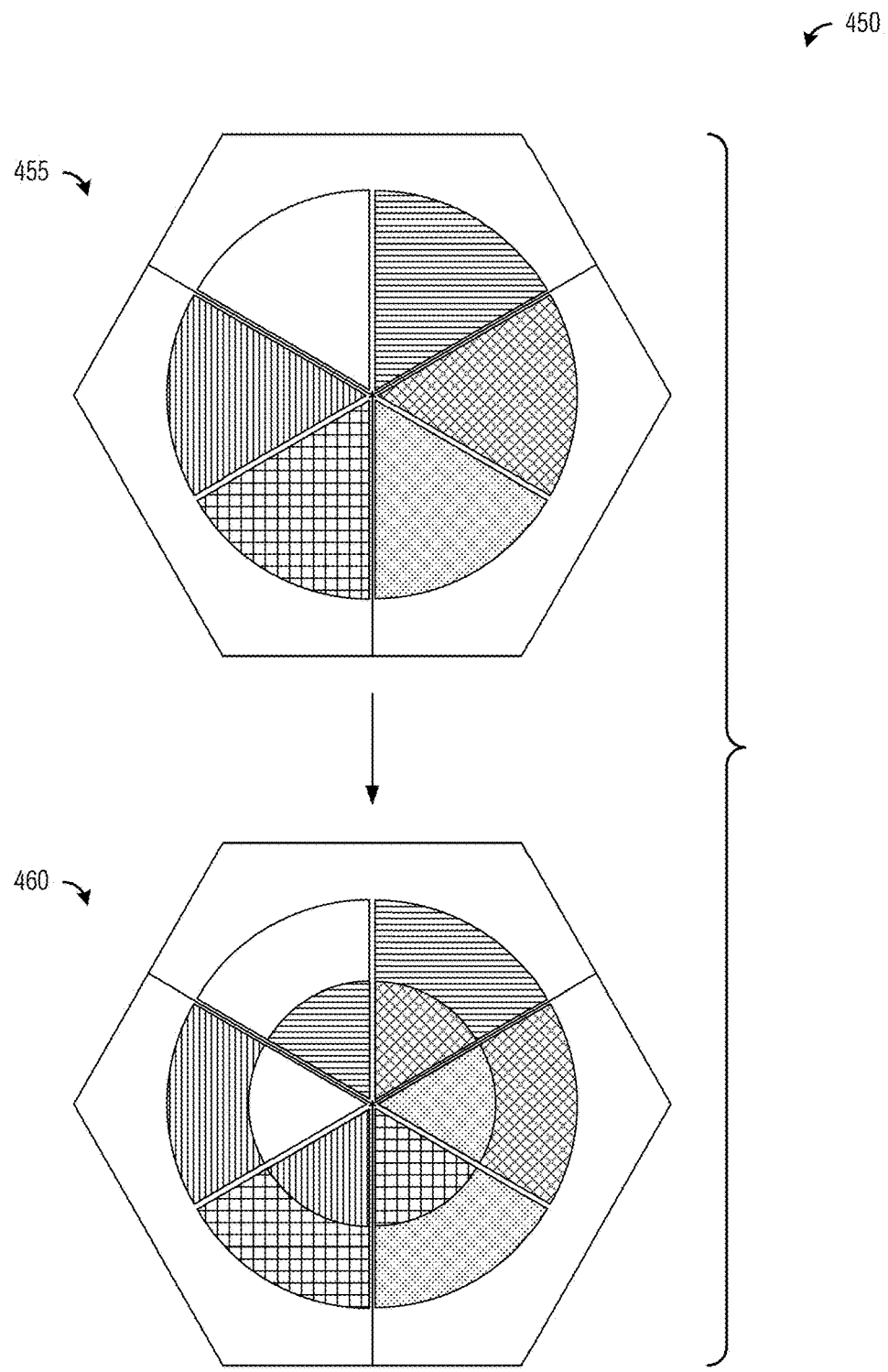
FIG. 4b illustrates example coverage areas of a 3 sector communications system with a split beam antenna according to example embodiments described herein.

FIG. 4b illustrates example coverage areas 450 of a 3 sector communications system with a split beam antenna. Coverage areas 450 show that a 3 sector communications system utilizing a split beam antenna is able to achieve a coverage pattern similar to that of a 6 sector communications system. A first coverage area 455 displays the coverage pattern for a 3 sector communications system with a single tilt angle split beam antenna and a second coverage area 460 displays the coverage pattern for a 3 sector communications system with a split beam antenna with a low tilt angle and a high tilt angle. When combined with different polarizations, the use of the split beam antenna with two tilt angles may enable more vertical dimension functionality and gain.

Figure 5:
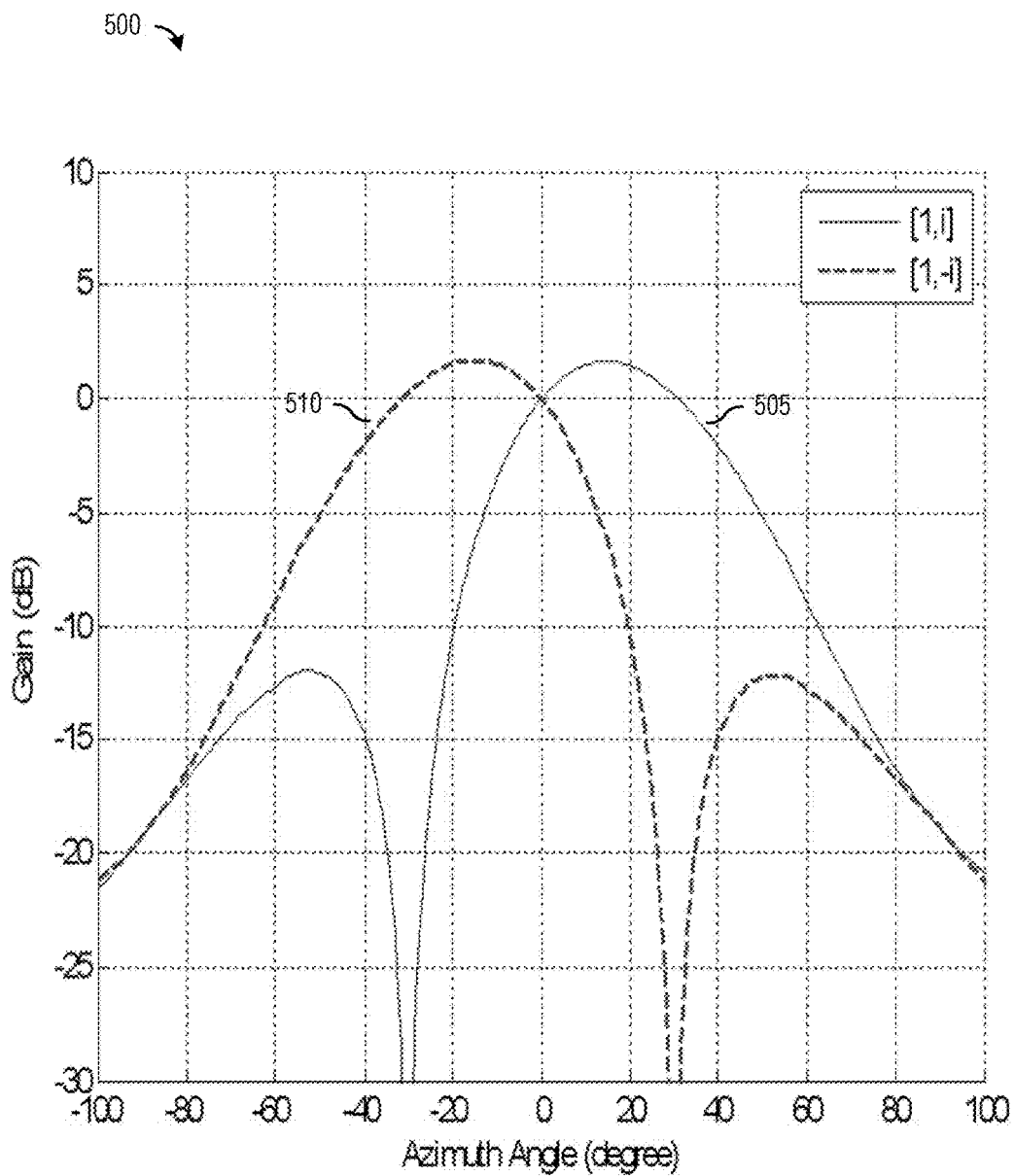
FIG. 5 illustrates plot of antenna gain as a function of angle for example antenna beams according to example embodiments described herein.

FIG. 5 illustrates plot 500 of antenna gain as a function of angle for example antenna beams. Plot 500 illustrates antenna gain as a function of angle for two example antenna beams (beam [1, j] 505 and beam [1, −j] 510) of a conventional horizontal 4T communications system supporting MU-MIMO that employs 2 column cross-polarized antennas spaced ½ wavelength apart as illustrated in FIG. 2. Each antenna has beams with a horizontal beam width of 65 degrees. Beams 505 and 510 correspond to 2 of the possible beams generated using a 3GPP LTE Release-8 4T codebook. Beam 505 may be generated by code [1, j], while beam 510 may be generated by code [1, −j]. Therefore, the beams may be referred by their code, such as beam 505 may be referred to as beam [1, j] and beam 510 [1, −j] or simply by their codes, such as code [1, j] for beam 505 and code [1, −j] for beam 510. The imaginary number, j (square root (−1)) can sometimes be denoted i, either notation can be used without confusion.

MU-MIMO gain may depend on being able to schedule two (or more) UEs simultaneously on the same resource block(s) (RB) with low mutual interference. As an illustrative example, a first UE scheduled using beam 505 (corresponding to code [1,j]) can be paired with a second UE scheduled using beam 510 (corresponding to code [1,−j]). However, the mutual interference is low only if the two UEs are located close to each other's null, which is limited to a narrow range around +30 degrees and −30 degrees. Due to availability of only discretized feedback from UEs, the eNB generally knows nothing about their positions relative to each other's null. Furthermore, due to angle spread in the propagation environment, the nulls disappear, and the mutual interference is even worse. Generally, there is not a single pair of beams that would work well, i.e., produce low mutual interference, therefore, resulting in poor MU-MIMO performance.

According to an example embodiment, the use of a split beam antenna produces antenna beams that have low mutual interference under realistic cellular propagation environment and discretized UE feedback conditions. The use of such beams to schedule multiple UEs simultaneously may significantly increase overall communications system throughput.

Figure 6:
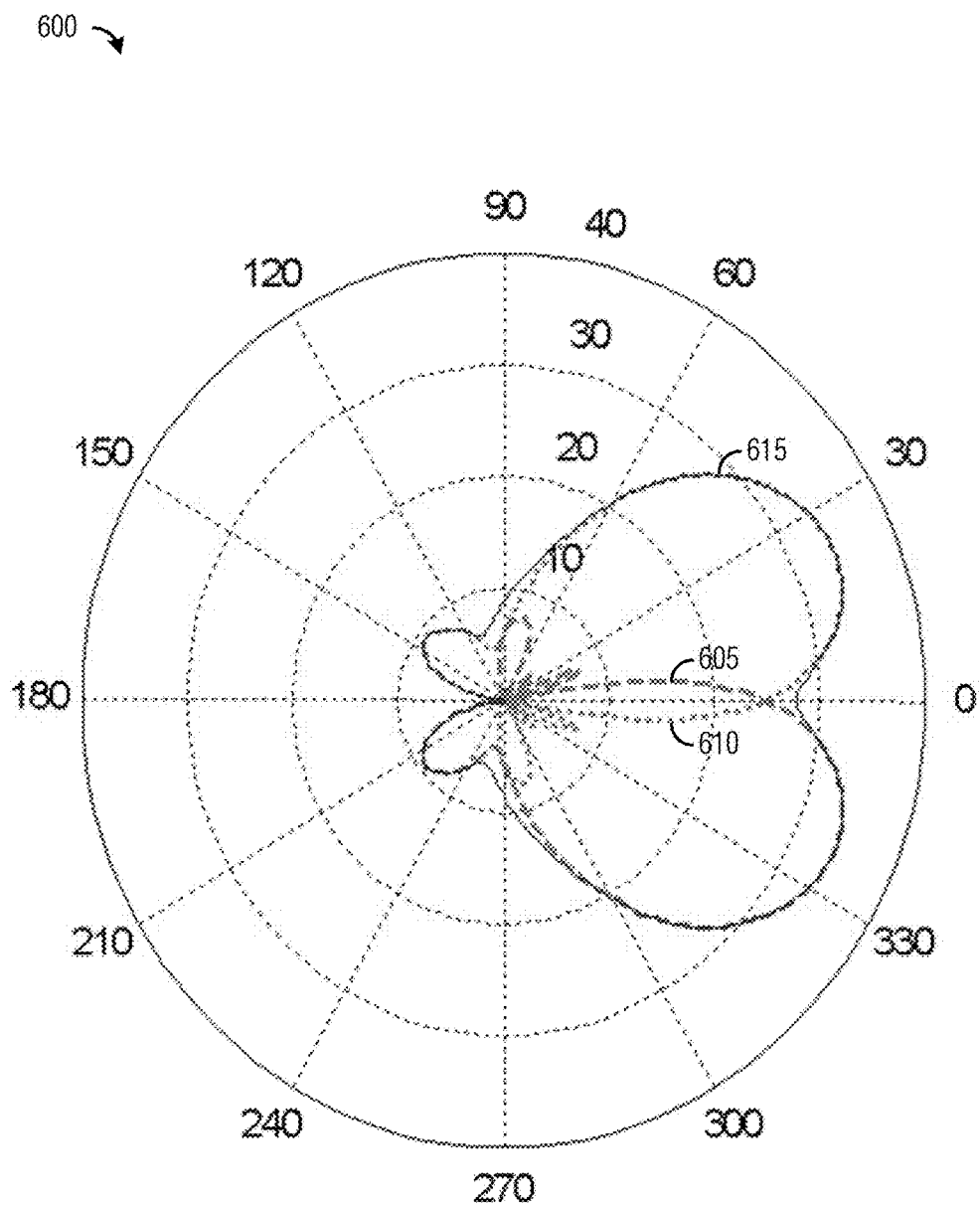
FIG. 6 illustrates a polar plot of an example split beam antenna pattern according to example embodiments described herein.

FIG. 6 illustrates a polar plot 600 of an example split beam antenna pattern. According to an example embodiment, a split beam antenna includes two separate antennas, each antenna with 35-degree beamwidth. Alternatively, a split beam antenna includes a single multi-column antenna (e.g., 3 or 4 columns) where the two 35-degree beams are generated through an RF feeding network or digital beam forming techniques. Polar plot 600 shows a split beam antenna pattern with two semi-overlapping traces 605 and 610, resulting in an overall split beam antenna pattern 615, which is a sum of two semi-overlapping traces 605 and 610.

As discussed previously, the coverage of reference signals may need to be adjusted in order to ensure proper standard MIMO processing. Reference signals may be used for synchronization, timing advance, and the like, therefore, coverage of the reference signals is important for operation.

According to an example embodiment, reference signal coverage is equalized between different baseband antenna ports by employing a mapping between baseband antenna ports and the antenna beams as presented herein. In a cross-polarized antenna case, the 4 narrow antenna beams with 2 cross polarizations may be denoted as: A/, B/, A\, and B\, where "/" represents the +45 degree polarization and "\" represents the −45 degree polarization. An example mapping is as follows:
 Port 0: A/−j*B/;
 Port 1: B/−j*A/;
 Port 2: A\−j*B\; and
 Port 3: B\−j*A\.
The resulting beams for all 4 baseband antenna ports have identical beam pattern magnitudes and hence, the same coverage in practice.

According to an example embodiment, communications resource re-use is increased to improve communications system capacity. Both MU-MIMO and sectorization use and/or communications system resource re-use can be used to increase overall performance. However, MU-MIMO may compare unfavorably to sectorization in terms of an equivalent number of transmitters.

As an illustrative example, changing from a 3 sector system to a 6 sector system may yield about a 60-80 percent capacity gain. However, operators of communications systems may be reluctant to change to the 6 sector system due to having to redo network planning and optimization. But, traditional 4T 3GPP LTE systems, such as the one illustrated in FIG. 2, operating with MU-MIMO appears to have produced far less gain but also uses the same number of transmitters (4) as a 6 sector system.

Figure 7A:
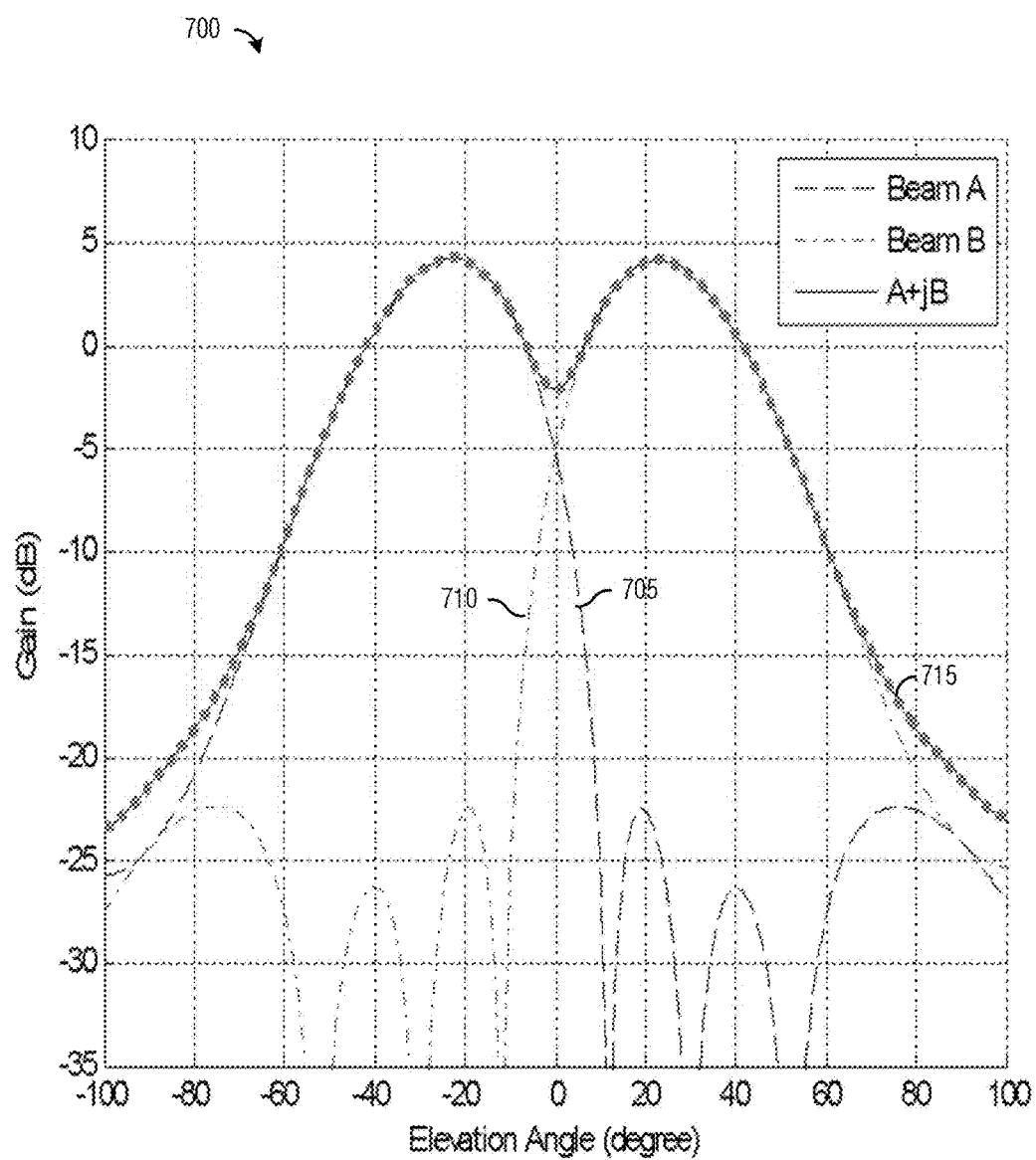
FIG. 7a illustrates a graph of example beam patterns of reference signals according to example embodiments described herein.
Figure 7B:
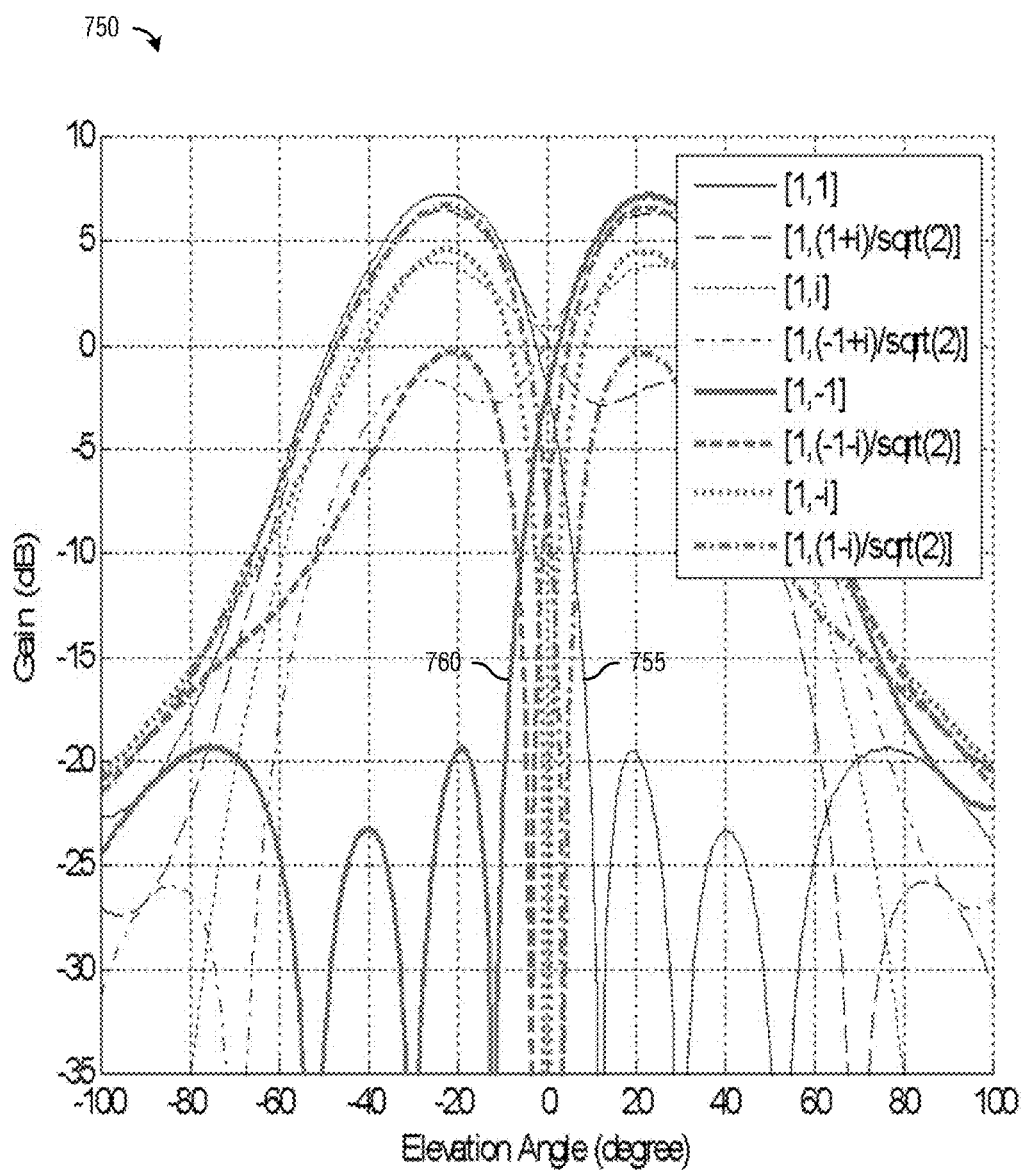
FIG. 7b illustrates a graph of example beam patterns of UE data using a precoding codebook according to example embodiments described herein.

FIG. 7a illustrates a graph 700 of example beam patterns of reference signals. Graph 700 highlights beam A 705, beam B 710, and A+jB and A−jB (which is simply B−jA multiplied by −j) (both are superimposed on each other as trace 715). FIG. 7b illustrates a graph 750 of example beam patterns of UE data using a precoding codebook. Graph 750 displays beam patterns with consideration being given to 1 polarization. From graph 750, it may be evident that only one pair of codes or beams that produce very low mutual interference (even under large angle spread), namely [1,1] 755 and [1,−1] 760. It is noted that the mapping used in graph 750 is port 0=A\+j*B\, port 1=A\−j*B\, port 2=A/+j*B/, and port 3=A/−j*B/ and that only 1 polarization is shown.

Figure 7C:
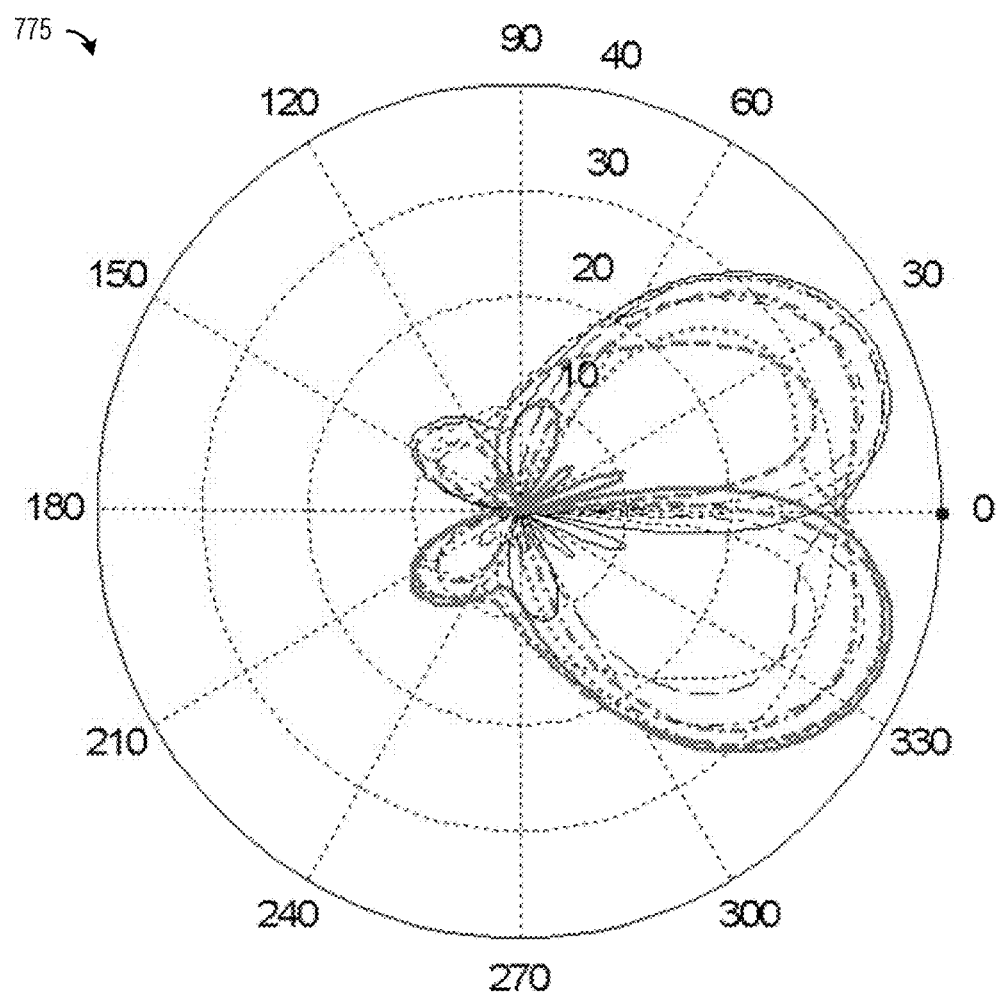
FIG. 7c illustrates a graph of example beam patterns using precoding codebooks according to example embodiments described herein.

FIG. 7c illustrates a graph 775 of example beam patterns using precoding codebooks. The scheduling and pairing of UEs may be critical to achieving good MU-MIMO performance and achieving high capacity. According to an example embodiment, the improved performance arises from several different aspects. A first aspect is that two UEs from two halves of the sector can always be scheduled on codes [1,1] and [1,−1] simultaneously. Their mutual interference may not be worse than in a 6 sector communications system case. The UE feedback using the codebook may clearly identify the UE location in the azimuth angle, enabling the pairing of the UEs. When ignoring certain 3GPP LTE technical standards release 8 (R8) limitations on MU-MIMO scheduling, this may result in at least the same level of performance as the 6 sector communications system case.

A second aspect is that the UEs feedback code [1,j] may be located at the bore side of the antenna and would be edge users with relatively poor performance in the overlap region in the 6 sector communications system case. According to an example embodiment, the performance of these UEs is significantly improved by scheduling them in a single user (SU) mode. This may be similar to the 6 sector communications system solution with joint scheduling between two adjacent sectors, which should yield better performance than a 6 sector communications system with independent scheduling.

A third aspect is that for future releases of the 3GPP LTE technical standards which may include flexible MU-MIMO pairing and scheduling, the performance can be further enhanced by pairing UEs with different power levels depending on their azimuth angles.

Therefore, a properly implemented MU-MIMO solution with an antenna remote unit (ARU) type of antenna can generally achieve performance that is similar to or better than a 6 sector communications system solution.

Figure 8:
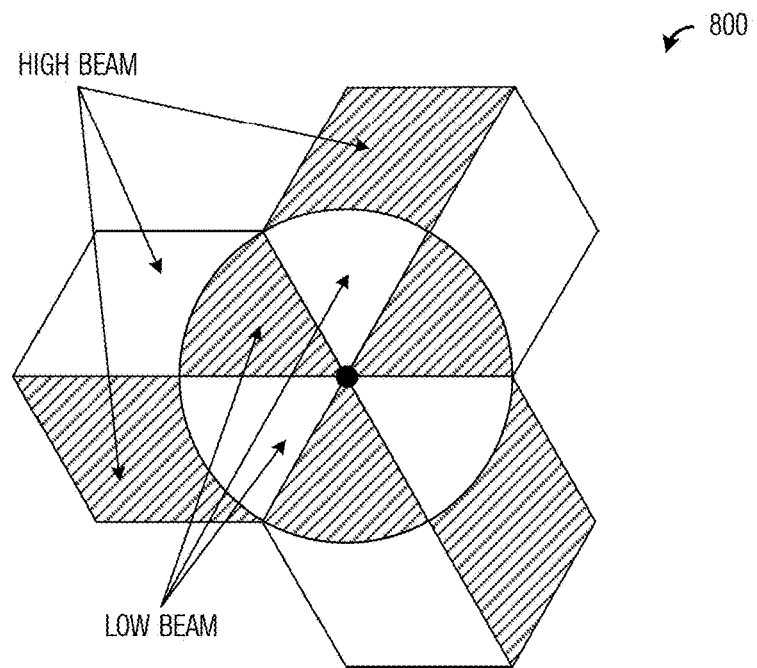
FIG. 8 illustrates an example coverage area map for a 3 sector communications system with different down-tilt angles according to example embodiments described herein.

According to an example embodiment, multiple polarizations are combined with different down-tilt angles to obtain additional vertical dimension functionality and gain. FIG. 8 illustrates an example coverage area map 800 for a 3 sector communications system with different down-tilt angles. As shown in FIG. 8, the use of a split beam antenna and the combination of two different polarizations and two different down-tilt angles results in two different high tilt beams and two different low tilt beams per sector. Different UEs can be served in each of the four beams. It is noted that more than two horizontal beams and two tilt angles may be used to further increase gain.

As an illustrative example, 4 narrow beams are represented as follows:
  A\H—Left beam with −45 polarization and small down-tilt angle;
  B\L—Right beam with −45 polarization and large down-tilt angle;
  A/L—Left beam with +45 polarization and large down-tilt angle; and
  B/H—Right beam with +45 polarization and small down-tilt angle.

Multiple mappings between the baseband antenna ports and the antenna beams are possible. As an illustrative example, one mapping is as follows:
  Port 0: A/L−j*A\H−j*B/H−B\L;
  Port 1: −j*A/L−A\H+B/H−j*B\L;
  Port 2: −A/L−j*A\H−j*B/H−B\L; and
  Port 3: −j*A/L+A\H−B/H−j*B\L.

In general, the coverage area of the reference signals of all of the baseband antenna ports is substantially the same. Due to the additional isolation introduced by the different down-tilt angles, more simultaneous UEs (e.g., 4 UEs per sector as shown in coverage area map 800) may be scheduled with low mutual interference, further enhancing communications system throughput and capacity.

Figure 9:
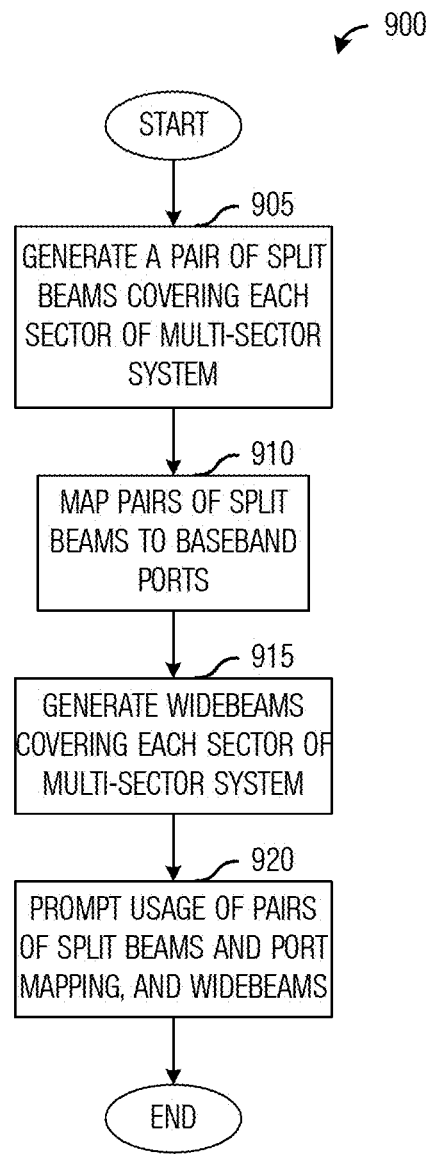
FIG. 9 illustrates a flow diagram of example operations occurring in the configuration of a communications system using split beam antennas according to example embodiments described herein.

FIG. 9 illustrates a flow diagram of example operations 900 occurring in the configuration of a communications system using split beam antennas. Operations 900 may be indicative of operations occurring in a device, such as a designing device, an eNB, or another network entity, involved in the configuration of a communications system using split beam antennas.

Operations 900 may begin with the device generating a pair of split beams that cover each sector of a multi-sector communications system (block 905). As an example, the split beams may have a beam pattern as shown by beam 605 and 610 of FIG. 6. A single pair of split beams may be used for each sector of the multi-sector communications system. Each split beam of the pair of split beams may be referred to by its corresponding code, such as a code from a 3GPP LTE codebook. The device may map the pair of split beams to antenna baseband ports (block 910). The device may use any of the mappings discussed herein to map the pair of split beams to antenna baseband ports. The device may generate widebeams covering each sector of the multi-sector communications system (block 915). The widebeams may simply be combinations of the pair of split beams. The widebeams may be referred to by their corresponding codes, such as codes from a 3GPP LTE codebook. The device may prompt the use of the pair of split beams, port mappings, and widebeams (block 920). The device may store information regarding the pair of split beams, port mappings, and widebeams to a memory where they can be subsequently provided to eNBs. The device may alternatively forward the information regarding the pair of split beams, port mappings, and widebeams to the eNBs.

Figure 10:
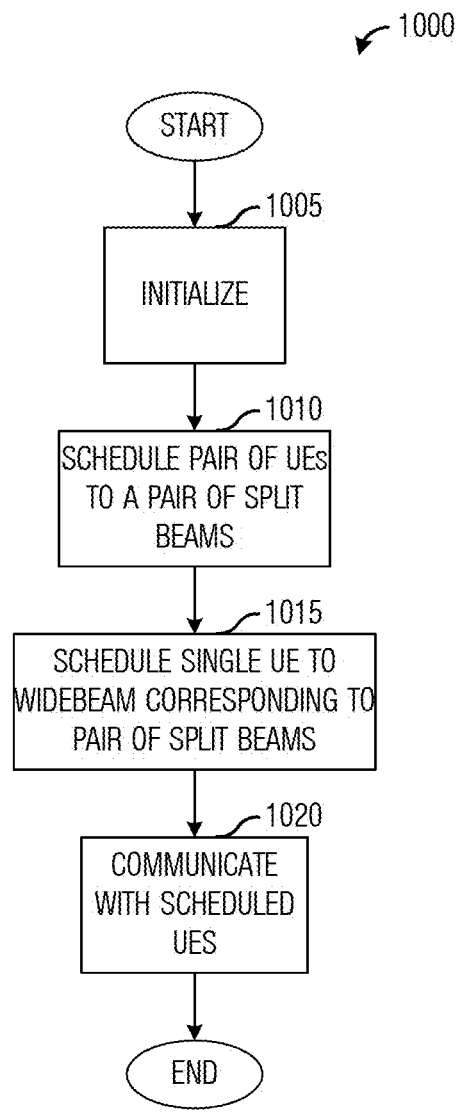
FIG. 10 illustrates a flow diagram of example operations occurring in a communications controller of a communications system using split beams communicating with UEs according to example embodiments described herein.

FIG. 10 illustrates a flow diagram of example operations 1000 occurring in a communications controller of a communications system using split beams communicating with UEs. Operations 1000 may be indicative of operations occurring in a communications controller of a communications system using split beams communicating with UEs.

Operations 1000 may begin with the communications controller initializing (block 1005). Initializing may include retrieving information regarding the pair of split beams, port mappings, and widebeams. The communications controller may schedule a pair of UEs to a pair of split beams (block 1010). The pair of split beams may have associated codes that are used to generate the pair. Scheduling the pair of UEs may include determining a need for the UEs in the pair of UEs to communicate with the communications controller (in other words, there is data to be transmitted to the UEs or there is data at the UEs to be transmitted to the communications controller). Scheduling the pair of UEs may also include selecting the pair of UEs from a plurality of UEs that have a need to communicate. The selection of the pair of UEs may be in accordance with selection criteria, including but not limited to, amount of data, UE service history, UE priority, Quality of Service (QoS) requirements of the UEs, communications system load, communications system traffic, UE position and/or location, and the like. Scheduling the pair of UEs may also include allocating one or more communications system resources to the UEs and informing the UEs about the allocated communications system resources. In general, the communications system may need to provide the UEs with sufficient information to enable the UEs to communicate. The information may include the allocated communications system resources, and other information, including a modulation and coding scheme (MCS) level, rank information (for MIMO operation), precoder information, and so on.

The communications controller may schedule a UE to a widebeam (block 1015). The widebeam may have a code used to generate the widebeam. In situations where it may be more effective to schedule a single UE rather than a pair of UEs, such as when the single UE is at the edge of the coverage area, only a single UE meets the selection criteria, and the like, the communications controller schedules the single UE to a widebeam. The widebeam may correspond to a pair of split beams that cover the sector. The scheduling of the UE may be similar to the scheduling of the pair of UEs. The communications controller may communicate with the scheduled UEs (block 1020).

Figure 11B:
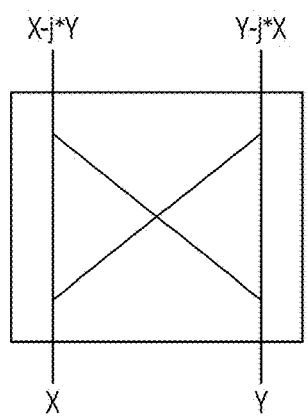
FIG. 11b illustrates a circuit diagram of an example 90-degree hybrid coupler according to example embodiments described herein.
Figure 11C:
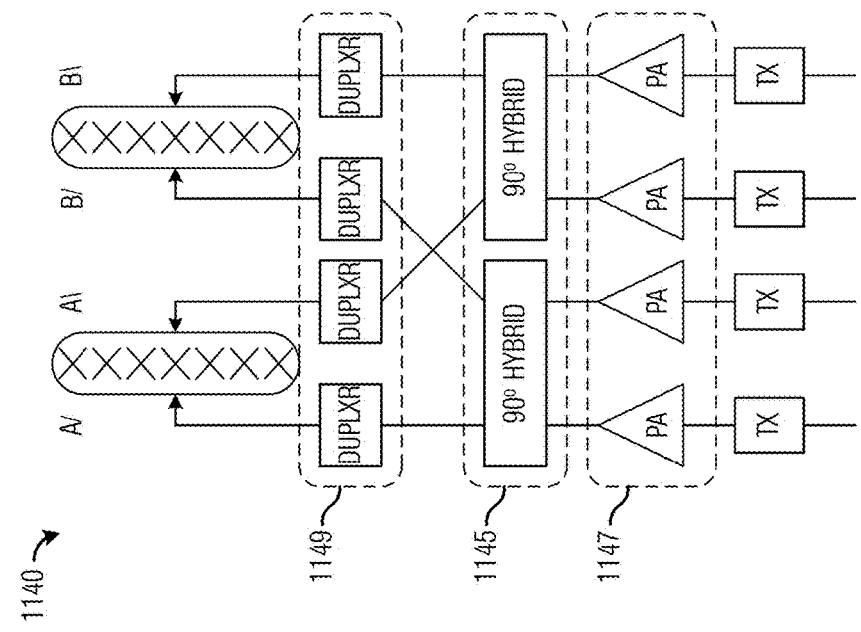
FIG. 11c illustrates a first example 4T 3GPP LTE system with 90-degree hybrid couplers according to example embodiments described herein.
Figure 11A:
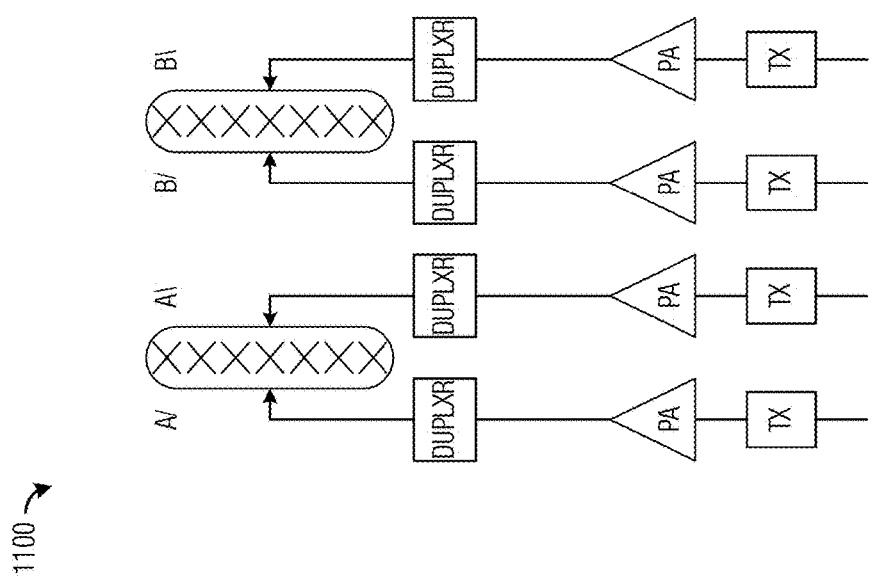
FIG. 11a illustrates an example 4T 3GPP LTE system with a two-column cross-polarized antenna according to example embodiments described herein.

FIG. 11a illustrates an example 4T 3GPP LTE system 1100 with a two-column cross-polarized antenna. 4T 3GPP LTE system 1100 may be modified to implement the port mappings described previously when the use of 90-degree hybrid couplers. FIG. 11b illustrates a circuit diagram of an example 90-degree hybrid coupler 1120. 90-degree hybrid coupler 1120 includes two input ports and two output ports. If the inputs are labeled X and Y, then the two output ports are X−j*Y and Y−j*X.

Figures 11D, 11E:
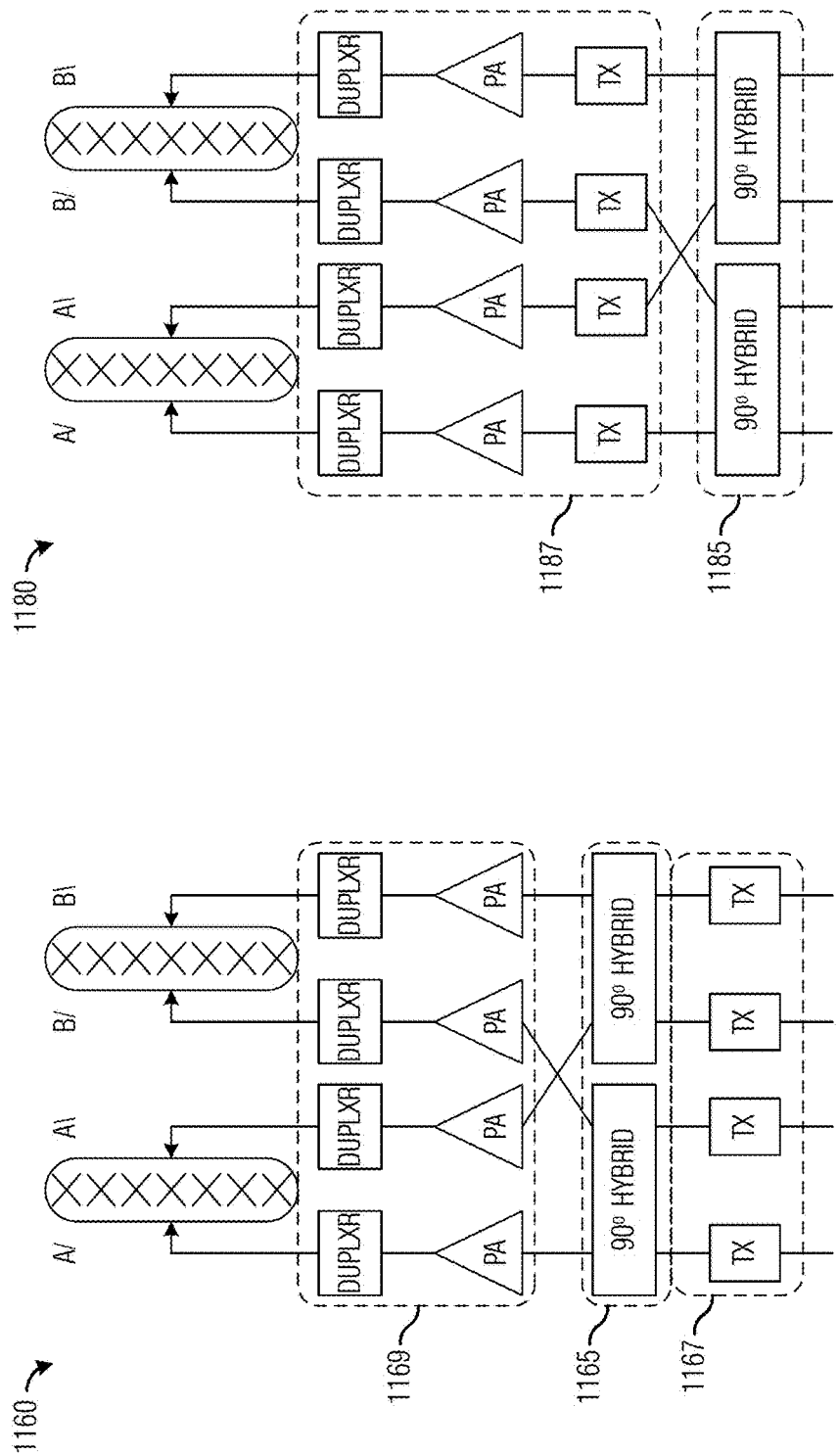
FIG. 11d illustrates a second example 4T 3GPP LTE system with 90-degree hybrid couplers according to example embodiments described herein.
FIG. 11e illustrates a third example 4T 3GPP LTE system with 90-degree hybrid couplers according to example embodiments described herein.

FIG. 11c illustrates a first example 4T 3GPP LTE system 1140 with 90-degree hybrid couplers. 4T 3GPP LTE system 1140 includes a pair of 90-degree hybrid couplers 1145 coupled in between PAs 1147 and duplexers 1149. The configuration of 4T 3GPP LTE system 1140 may be referred to as an "after power amplification" configuration. FIG. 11d illustrates a second example 4T 3GPP LTE system 1160 with 90-degree hybrid couplers. 4T 3GPP LTE system 1160 includes a pair of 90-degree hybrid couplers 1165 coupled in between transmitters 1167 and PAs/duplexers 1169. The configuration of 4T 3GPP LTE system 1160 may be referred to as an "in small signal radio frequency (RF) domain" configuration. FIG. 11e illustrates a third example 4T 3GPP LTE system 1180 with 90-degree hybrid couplers. 4T 3GPP LTE system 1180 includes a pair of 90-degree hybrid couplers 1185 before transmitters/PAs/duplexers 1187. The configuration of 4T 3GPP LTE system 1180 may be referred to as an "in digital intermediate frequency (IF) domain" configuration. It is noted that the after power amplification configuration (4T 3GPP LTE system 1140) has an inherent benefit of PA sharing between the split beams, which may allow for significantly improved coverage over a conventional 6 sector communications system configuration, since in the 6 sector communications system configuration, a UE can receive signals from at most 2 PAs (e.g., the two PAs driving the A/ and A\ antennas). However, in 4T 3GPP LTE system 1140, all four PAs can deliver the signals to a single UE through the A/ and A\ antennas.

Figure 12:
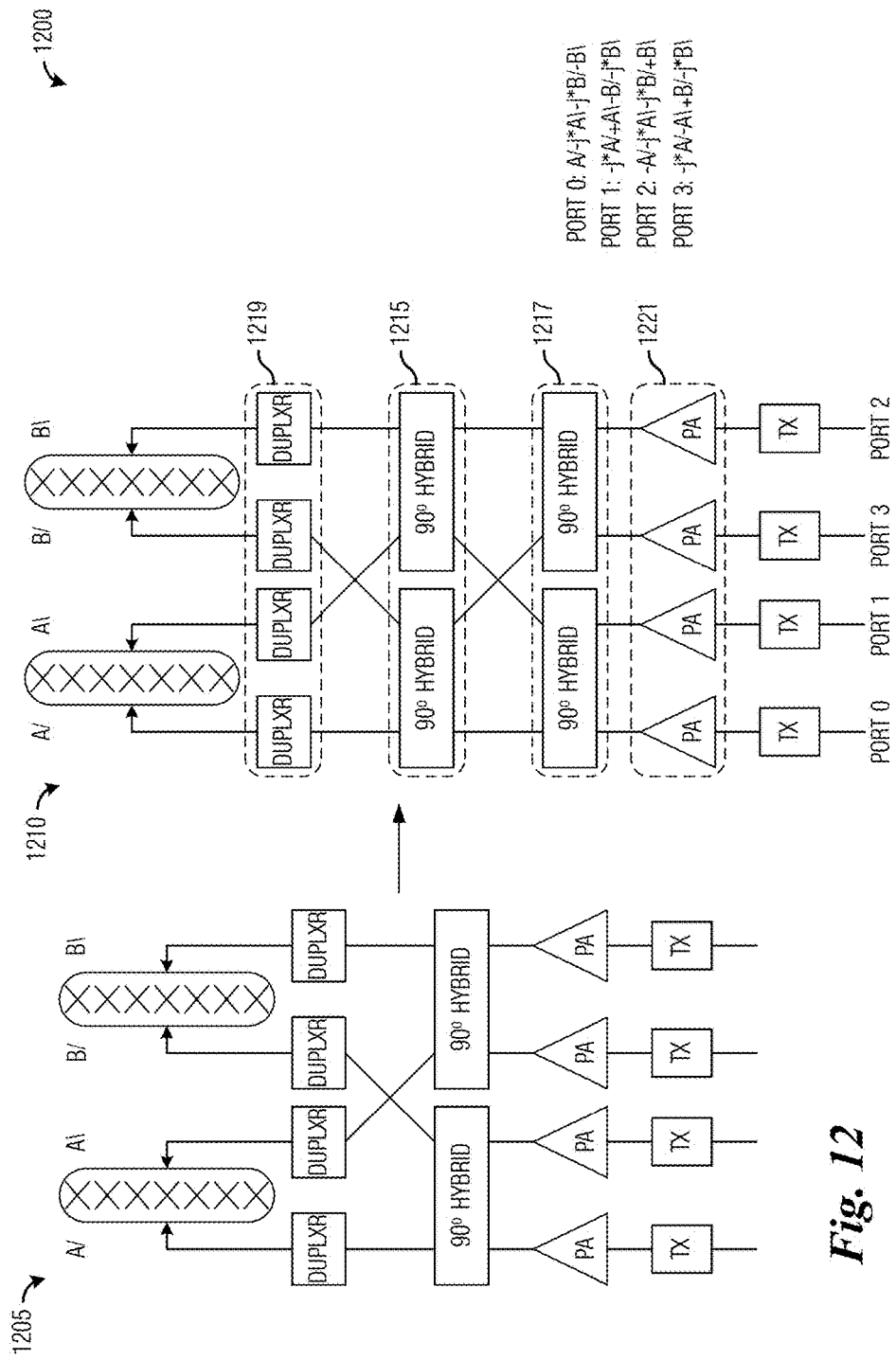
FIG. 12 illustrates a diagram of an example extension of a 4T 3GPP LTE system to include sharing between two different polarizations according to example embodiments described herein.

FIG. 12 illustrates a diagram 1200 of an example extension of a 4T 3GPP LTE system to include sharing between two different polarizations. A 4T 3GPP LTE system 1205 may be extended to include sharing between two different polarizations (as shown in 4T 3GPP LTE system 1210) by adding a second pair of 90-degree hybrids 1215 coupled between an existing pair of 90-degree hybrids 1217 and duplexers 1219. Although shown in FIG. 12 as being positioned immediately after existing pair of 90-degree hybrids 1217, second pair of 90-degree hybrids 1215 may be coupled between existing pair of 90-degree hybrids 1217 and PAs 1221. 4T 3GPP LTE system 1210 may realize the mapping as follows:

Port 0: A/−j*A\−j*B/−B\;
Port 1: −j*A/−A\+B/−j*B\;
Port 2: −A/−j*A\−j*B/+B\; and
Port 3: −j*A/+A\−B/−j*B\.

Figure 13:
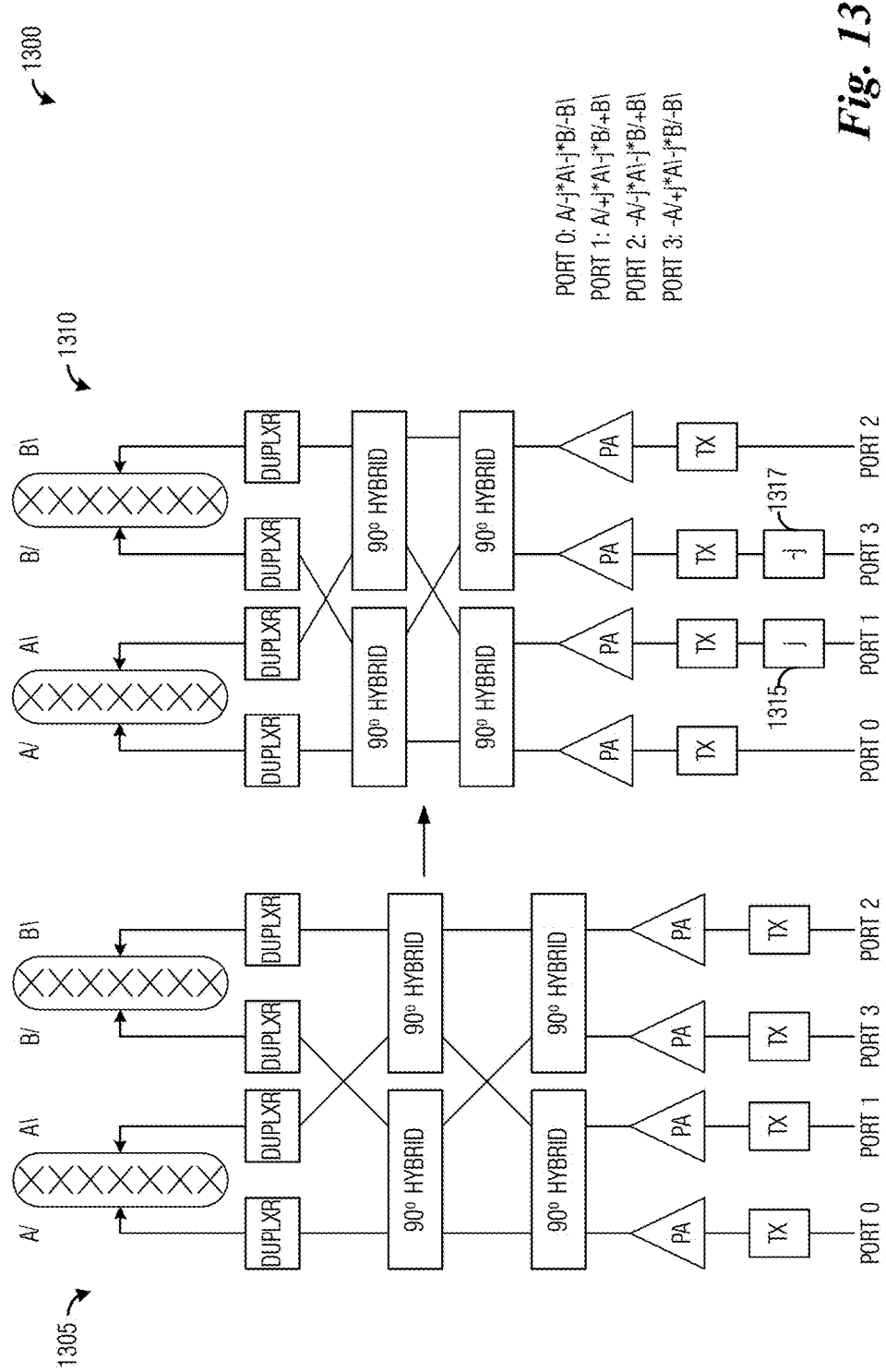
FIG. 13 illustrates a diagram of a modification of a 4T 3GPP LTE system for compatibility with LTE codebook according to example embodiments described herein.

FIG. 13 illustrates a diagram 1300 of a modification of a 4T 3GPP LTE system for compatibility with LTE codebook. Diagram 1300 displays a 4T 3GPP LTE system 1305 that supports sharing between two different polarizations. In order to generate the four basic beams (i.e., A/, A\, B/, and B\) as data beams for individual UEs for the purpose of optimal MU-MIMO operation, the encoding may need slight modifications. 4T 3GPP LTE system 1310 includes additional phase shifts (as implemented by phase shifters 1315 and 1317) that may be necessary in the baseband. Actual modification to 4T 3GPP system 1305 is not necessary. 4T 3GPP LTE system 1310 may realize the mapping as follows:

Port 0: A/−j*A\−j*B/−B\;
Port 1: A/+j*A\−j*B/+B\;
Port 2: −A/−j*A\−j*B/+B\; and
Port 3: −A/+j*A\−j*B/−B\.

Figure 14:
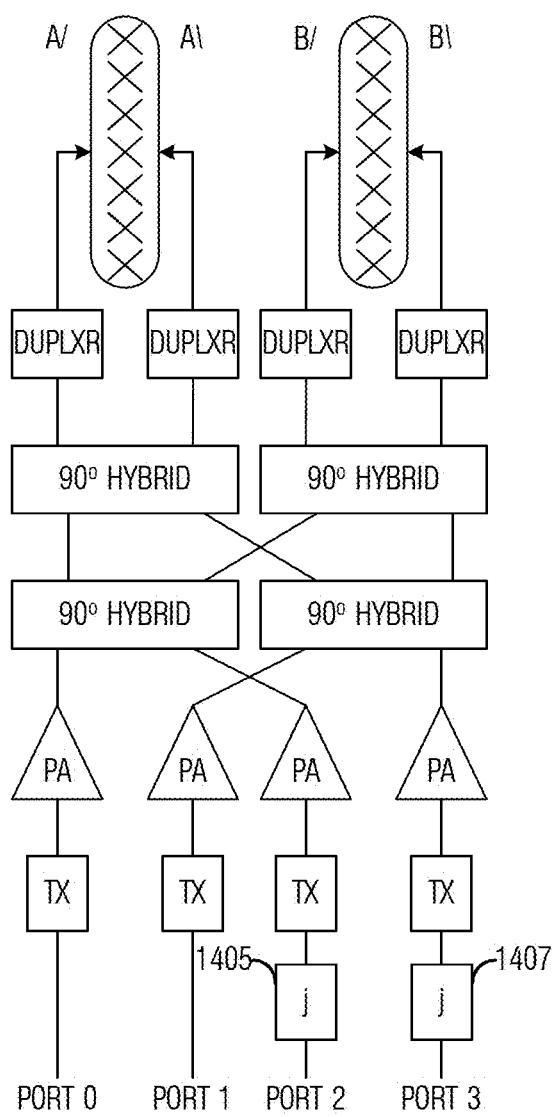
FIG. 14 illustrates an example 4T 3GPP LTE system for use with a 3GPP LTE standard 4T codebook according to example embodiments described herein.

FIG. 14 illustrates an example 4T 3GPP LTE system 1400 for use with a 3GPP LTE standard 4T codebook. 4T 3GPP LTE system 1400 is similar to 4T 3GPP LTE system 1310 of FIG. 13 with the exception of phase shifters 1405 and 1407 of 4T 3GPP LTE system 1400 being coupled to ports 2 and 3 instead of phase shifters 1315 and 1317 being coupled to ports 1 and 3 of 4T 3GPP LTE system 1310. A table below shows the mapping of baseband ports to achieve the 4 basic beams.

| Baseband Port | A\H | A/L | B\H | B/L |
|---|---|---|---|---|
| 0 | 1 | −j | −j | −1 |
| 1 | −j | 1 | −1 | −j |
| 2 | 1 | −j | j | 1 |
| 3 | −j | 1 | 1 | j |

Figure 15:
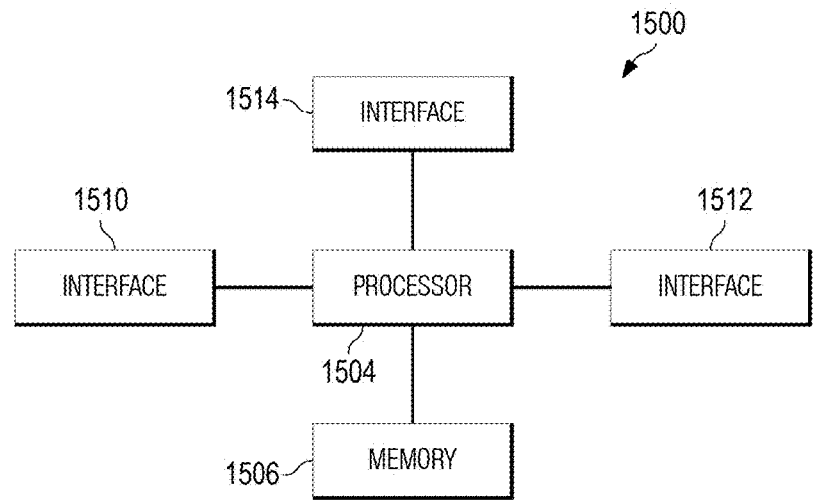
FIG. 15 illustrates a block diagram of an embodiment processing system 1500 for performing methods described herein.

FIG. 15 illustrates a block diagram of an embodiment processing system 1500 for performing methods described herein, which may be installed in a host device. As shown, the processing system 1500 includes a processor 1504, a memory 1506, and interfaces 1510-1514, which may (or may not) be arranged as shown in FIG. 15. The processor 1504 may be any component or collection of components adapted to perform computations and/or other processing related tasks, and the memory 1506 may be any component or collection of components adapted to store programming and/or instructions for execution by the processor 1504. In an embodiment, the memory 1506 includes a non-transitory computer readable medium. The interfaces 1510, 1512, 1514 may be any component or collection of components that allow the processing system 1500 to communicate with other devices/components and/or a user. For example, one or more of the interfaces 1510, 1512, 1514 may be adapted to communicate data, control, or management messages from the processor 1504 to applications installed on the host device and/or a remote device. As another example, one or more of the interfaces 1510, 1512, 1514 may be adapted to allow a user or user device (e.g., personal computer (PC), etc.) to interact/communicate with the processing system 1500. The processing system 1500 may include additional components not depicted in FIG. 15, such as long term storage (e.g., non-volatile memory, etc.).

In some embodiments, the processing system 1500 is included in a network device that is accessing, or part otherwise of, a telecommunications network. In one example, the processing system 1500 is in a network-side device in a wireless or wireline telecommunications network, such as a base station, a relay station, a scheduler, a controller, a gateway, a router, an applications server, or any other device in the telecommunications network. In other embodiments, the processing system 1500 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 16:
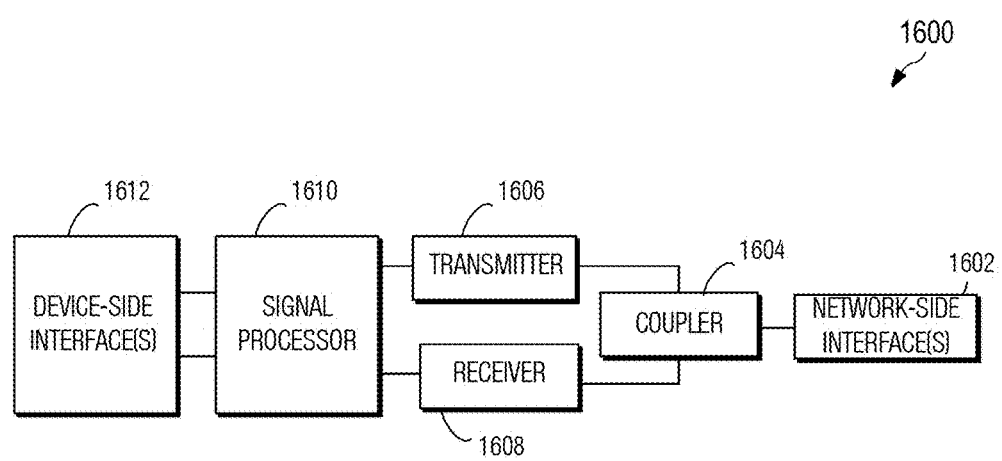
FIG. 16 illustrates a block diagram of a transceiver 1600 adapted to transmit and receive signaling over a telecommunications network according to example embodiments described herein.

In some embodiments, one or more of the interfaces 1510, 1512, 1514 connects the processing system 1500 to a transceiver adapted to transmit and receive signaling over the telecommunications network. FIG. 16 illustrates a block diagram of a transceiver 1600 adapted to transmit and receive signaling over a telecommunications network. The transceiver 1600 may be installed in a host device. As shown, the transceiver 1600 comprises a network-side interface 1602, a coupler 1604, a transmitter 1606, a receiver 1608, a signal processor 1610, and a device-side interface 1612. The network-side interface 1602 may include any component or collection of components adapted to transmit or receive signaling over a wireless or wireline telecommunications network. The coupler 1604 may include any component or collection of components adapted to facilitate bi-directional communication over the network-side interface 1602. The transmitter 1606 may include any component or collection of components (e.g., up-converter, power amplifier, etc.) adapted to convert a baseband signal into a modulated carrier signal suitable for transmission over the network-side interface 1602. The receiver 1608 may include any component or collection of components (e.g., down-converter, low noise amplifier, etc.) adapted to convert a carrier signal received over the network-side interface 1602 into a baseband signal. The signal processor 1610 may include any component or collection of components adapted to convert a baseband signal into a data signal suitable for communication over the device-side interface(s) 1612, or vice-versa. The device-side interface(s) 1612 may include any component or collection of components adapted to communicate data-signals between the signal processor 1610 and components within the host device (e.g., the processing system 1500, local area network (LAN) ports, etc.).

The transceiver 1600 may transmit and receive signaling over any type of communications medium. In some embodiments, the transceiver 1600 transmits and receives signaling over a wireless medium. For example, the transceiver 1600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1602 comprises one or more antenna/radiating elements. For example, the network-side interface 1602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 17:
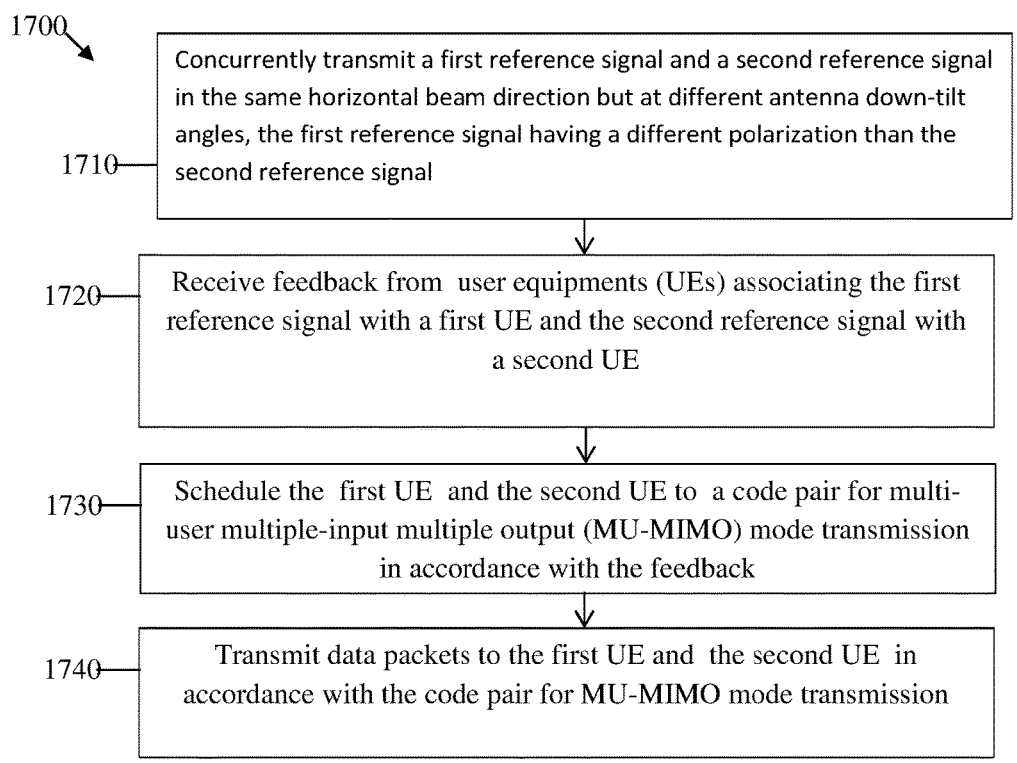
FIG. 17 illustrates a block diagram of an embodiment method for operating an evolved NodeB (eNB) in a wireless communications system.

FIG. 17 is a flowchart of an embodiment method 1700 for operating an eNB. At step 1710, the eNB concurrently transmit a first reference signal and a second reference signal in the same horizontal beam direction but at different antenna down-tilt angles. The first reference signal has a different polarization than the second reference signal. At step 1720, the eNB receives feedback associating the first reference signal with a first UE and the second reference signal with a second UE. At step 1730, the eNB schedules the first UE and the second UE to a code pair for a multi-user multiple-input multiple output (MU-MIMO) mode transmission in accordance with the feedback. At step 1740, the eNB transmits data packets to the first UE and the second UE in accordance with the code pair for MU-MIMO mode transmission.

Figure 18:
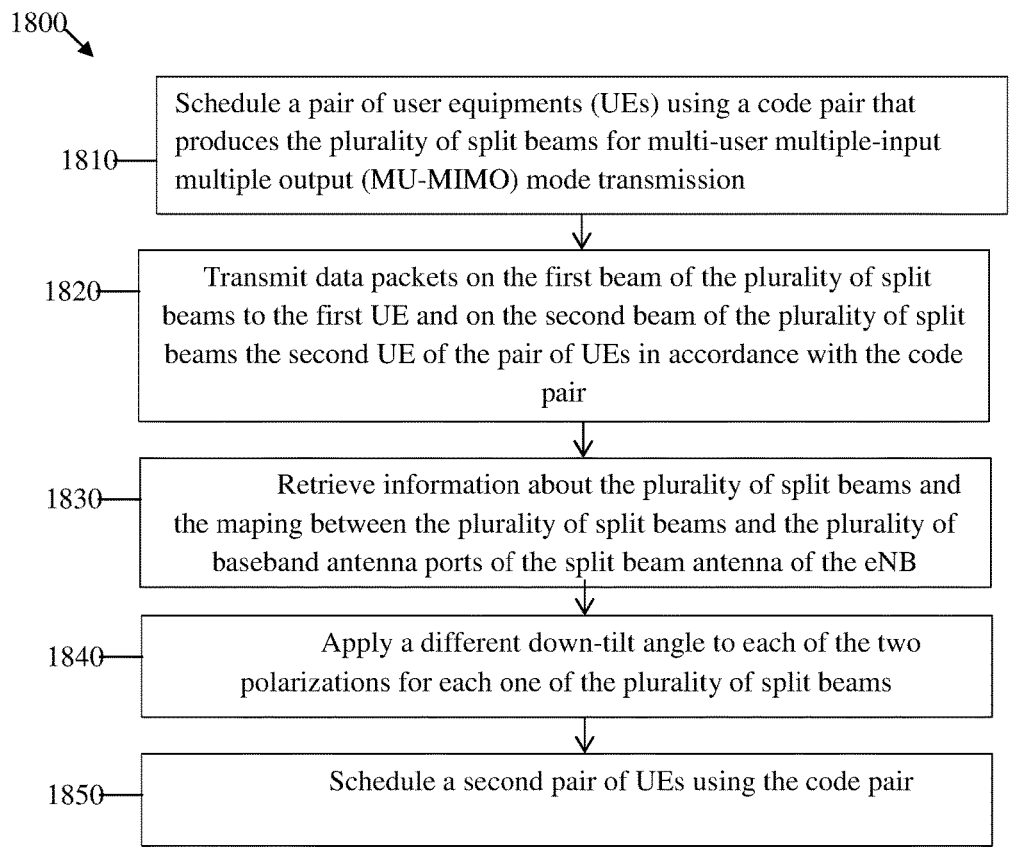
FIG. 18 illustrates a block diagram of another embodiment method for operating an eNB in a wireless communications system.

FIG. 18 is a flowchart of another embodiment method 1800 for operating an eNB. At step 1810, the eNB schedules a pair of UEs using a code pair that produces a plurality of split beams for multi-user multiple-input multiple output (MU-MIMO) mode transmission. At step 1820, the eNB transmits data packets on a first beam to a first UE and on a second beam to a second UE in accordance with the code pair. The first UE and the second UE belong to the pair of UEs, and the first beam and the second beam belong to the code pair. At step 1830, the eNB retrieves information about the plurality of split beams and the mapping between the plurality of split beams and a plurality of baseband antenna ports. At step 1840, the eNB applies a different down-tilt angle to each of the two polarizations for each one of the plurality of split beams. At step 1850, the eNB schedules a second pair of UEs using the code pair.

Although the present disclosure and its advantages have been described in detail, it should be understood that various changes, substitutions and alterations can be made herein without departing from the spirit and scope of the disclosure as defined by the appended claims.

What is claimed is:

1. A method for operating an evolved NodeB (eNB) in a wireless communications system, the method comprising:
concurrently transmitting, by the eNB, a first reference signal and a second reference signal in the same horizontal beam direction but at different antenna down-tilt angles, the first reference signal having a different polarization than the second reference signal;
receiving feedback from user equipments (UEs), the feedback associating the first reference signal with a first UE and the second reference signal with the second UE;
retrieving information about a plurality of split beams and a mapping between the plurality of split beams and baseband antenna ports, wherein the mapping equalizes reference signal coverage between the baseband antenna ports;
scheduling the first UE and the second UE to a code pair for multi-user multiple-input multiple output (MU-MIMO) mode transmission in accordance with the feedback; and
transmitting, by the eNB, data packets to the first UE and the second UE in accordance with the code pair for MU-MIMO mode transmission.

2. The method of claim 1, further comprising, scheduling a third UE using another code for a single user (SU) mode transmission.

3. The method of claim 1, wherein the first reference signal has +45° polarization and the second reference signal has a −45° polarization, the first reference signal having a smaller antenna down-tilt angle than the second reference signal.

4. The method of claim 1, further comprising:
scheduling a third UE using another code that produces a wide beam in an overlap region of a subset of a plurality of split beams for a single user (SU) mode transmission.

5. The method of claim 1, wherein at least a portion of the mapping is implemented in a radio frequency (RF) domain, after a power amplifier, using network elements to direct power to a particular split beam.

6. The method of claim 5, wherein the network elements comprise hybrid couplers.

7. The method of claim 1, wherein at least a portion of the mapping is implemented in a radio frequency (RF) domain, prior to a power amplifier, using network elements.

8. The method of claim 1, wherein at least a portion of the mapping is implemented in a digital domain using network elements.

9. The method of claim 1, wherein each one of the plurality of split beams has two polarizations, wherein the method further comprises, for each one of the plurality of split beams, applying a different down-tilt angle to each of the two polarizations, and wherein the mapping comprises mappings between each polarization of each split beam and the baseband antenna ports.

10. The method of claim 9, further comprising
scheduling a second pair of UEs using the code pair, wherein the UEs in the pair of UEs and the second pair of UEs are located in different ones of the two polarizations of the plurality of split beams.

11. The method of claim 1, further comprising, applying a phase shift to at least one of the baseband antenna ports.

12. The method of claim 1, wherein the plurality of split beams comprises 2 split beams.

13. An evolved NodeB (eNB) in a wireless communications system, the eNB comprising:
a processor; and
a non-transitory computer readable storage medium storing programming for execution by the processor, the programming including instructions to:
concurrently transmit a first reference signal and a second reference signal in the same horizontal beam direction but at different antenna down-tilt angles, the first reference signal having a different polarization than the second reference signal;
receive feedback from user equipments (UEs), the feedback associating the first reference signal with a first UE and the second reference signal with the second UE;
retrieve information about a plurality of split beams and a mapping between the plurality of split beams and baseband antenna ports, wherein the mapping equalizes reference signal coverage between the baseband antenna ports;
schedule the first UE the second UE to a code pair for multi-user multiple-input multiple output (MU-MIMO) mode transmission in accordance with the feedback; and
transmit data packets to the first UE and the second UE in accordance with the code pair for MU-MIMO mode transmission.

14. The eNB of claim 13, wherein the first reference signal has +45° polarization and the second reference signal has a −45° polarization, the first reference signal having a smaller antenna down-tilt angle than the second reference signal.

15. The eNB of claim 13, wherein the programming further includes instructions to schedule a third UE using another code that produces a wide beam in an overlap region of a subset of the plurality of split beams for a single user (SU) mode transmission.

16. The eNB of claim 13, wherein at least a portion of the mapping is implemented in a radio frequency (RF) domain, after a power amplifier, using network elements to direct all power to a particular split beam.

17. The eNB of claim 16, wherein the network elements comprise hybrid couplers.

18. The eNB of claim 13, wherein at least a portion of the mapping is implemented in a radio frequency (RF) domain, prior to a power amplifier, using network elements.

19. The eNB of claim 13, wherein at least a portion of the mapping is implemented in a digital domain using network elements.

20. The eNB of claim 13, wherein each one of the plurality of split beams has two polarizations, wherein the programming further includes instructions to, for each one of the plurality of split beams, apply a different down-tilt angle to each of the two polarizations, and wherein the mapping comprises mappings between each polarization of each split beam and the baseband antenna ports.

21. The eNB of claim 13, wherein the programming further includes instructions to schedule a second pair of UEs using the code pair, wherein the UEs in the pair of UEs and the second pair of UEs are located in different ones of the two polarizations of the plurality of split beams.

22. The eNB of claim 13, wherein the programming further includes instructions to apply a phase shift to at least one of the baseband antenna ports.

23. The eNB of claim 13, wherein the plurality of split beams comprises 2 split beams.

24. A non-transitory computer readable storage medium storing programming for execution by a processor, the programming including instructions to:

concurrently transmit a first reference signal and a second reference signal in the same horizontal beam direction but at different antenna down-tilt angles, the first reference signal having a different polarization than the second reference signal;

receive feedback from user equipments (UEs), the feedback associating the first reference signal with a first UE and the second reference signal with the second UE;

retrieve information about a plurality of split beams and a mapping between the plurality of split beams and baseband antenna ports, wherein the mapping equalizes reference signal coverage between the baseband antenna ports;

schedule the first UE and the second UE to a code pair for multi-user multiple-input multiple output (MU-MIMO) mode transmission in accordance with the feedback; and transmit, over a split beam antenna, data packets to the first UE and the second UE in accordance with the code pair for MU-MIMO mode transmission.

25. The non-transitory computer readable storage medium of claim 24, wherein the first reference signal has +45° polarization and the second reference signal has a −45° polarization, the first reference signal having a smaller antenna down-tilt angle than the second reference signal.

26. The non-transitory computer readable storage medium of claim 24, wherein the programming further includes instructions to apply a phase shift to at least one of the baseband antenna ports.

27. The non-transitory computer readable storage medium of claim 24, wherein the plurality of split beams comprises 2 split beams.

28. A method for operating an evolved NodeB (eNB) in a wireless communications system, the method comprising:

scheduling a pair of user equipments (UEs) comprising a first UE located in a first beam of a plurality of split beams and a second UE located in a second beam of the plurality of split beams, using a code pair that produces the plurality of split beams for multi-user multiple-input multiple output (MU-MIMO) mode transmission;

transmitting, by a split beam antenna of the eNB, data packets on the first beam of the plurality of split beams to the first UE and on the second beam of the plurality of split beams the second UE of the pair of UEs in accordance with the code pair, wherein the split beam antenna comprises a plurality of baseband antenna ports, and wherein the plurality of split beams is mapped by a mapping to the plurality of baseband antenna ports;

retrieving information about the plurality of split beams and the mapping between the plurality of split beams and the plurality of baseband antenna ports of the split beam antenna of the eNB, wherein the mapping equalizes reference signal coverage between the plurality of baseband antenna ports, wherein each one of the plurality of split beams has two polarizations;

for each one of the plurality of split beams, applying a different down-tilt angle to each of the two polarizations, and wherein the mapping comprises mappings between each polarization of each split beam and the baseband antenna ports; and scheduling a second pair of UEs using the code pair, wherein the UEs in the first pair of UEs and the second pair of UEs are located in different ones of the two polarizations of the plurality of split beams.

* * * * *